US009922387B1

(12) United States Patent
Newman et al.

(10) Patent No.: US 9,922,387 B1
(45) Date of Patent: Mar. 20, 2018

(54) STORAGE OF METADATA AND IMAGES

(71) Applicant: GOPRO, INC., San Mateo, CA (US)

(72) Inventors: David Newman, San Diego, CA (US);
Mark Vaden, San Mateo, CA (US);
Rolf Fischer, San Mateo, CA (US)

(73) Assignee: GoPro, Inc., San Mateo, CA (US)

( * ) Notice: Subject to any disclaimer, the term of this patent is extended or adjusted under 35 U.S.C. 154(b) by 0 days.

(21) Appl. No.: 15/001,038

(22) Filed: Jan. 19, 2016

(51) Int. Cl.
*G06T 1/00* (2006.01)
*G06F 17/30* (2006.01)
(Continued)

(52) U.S. Cl.
CPC ........ *G06T 1/0007* (2013.01); *G06F 17/3028* (2013.01); *H04N 1/32128* (2013.01);
(Continued)

(58) Field of Classification Search
CPC .... H04N 5/772; H04N 5/232; H04N 5/23229; H04N 5/23241; H04N 5/765; H04N 5/23245; H04N 5/23203; H04N 1/32128; H04N 1/2112; H04N 1/00204; H04N 1/00244; H04N 1/00127; H04N 2201/3253; H04N 2201/3277; H04N 2201/3252; H04N 2201/3274; H04N 2201/3228; G06F 17/3028; G06F 17/30265; G06F 17/30247;
(Continued)

(56) References Cited

U.S. PATENT DOCUMENTS

| 98,897 A | 1/1870 | Thobu |
|---|---|---|
| 563,528 A | 7/1896 | Willson |

(Continued)

FOREIGN PATENT DOCUMENTS

| EP | 0605045 A1 | 7/1994 |
|---|---|---|
| EP | 0650299 A1 | 4/1995 |
| EP | 0661672 A1 | 7/1995 |

OTHER PUBLICATIONS

U.S. Appl. No. 14/920,427, filed Oct. 22, 2015, entitled "Apparatus and Methods for Embedding Metadata Into Video Stream".
(Continued)

*Primary Examiner* — Michael Osinski
(74) *Attorney, Agent, or Firm* — Sheppard Mullin Richter & Hampton LLP

(57) ABSTRACT

Media capture apparatus and methods for obtaining metadata. Metadata may be collected and stored in a container independent of audio and/or image (media) content. Some container implementations may be configured to store metadata for a given interval, and media content for a portion of the interval. In action camera implementations, metadata may provide a context related to time, physical conditions of a person, location, surroundings of the video capture. In event recording applications, the metadata container may provide information related to a timeline of the event, environmental conditions, proximity of other capture devices. Metadata may be utilized for processing, viewing, and/or sharing of media content. Individual capture devices may communicate and/or combine metadata to one another in order to expand metadata content. Metadata, video and/or images may be shared between users and/or devices using a container.

20 Claims, 10 Drawing Sheets

(51) Int. Cl.
*H04N 5/232* (2006.01)
*H04N 1/32* (2006.01)
*G06K 9/00* (2006.01)

(52) U.S. Cl.
CPC ..... *H04N 5/23203* (2013.01); *H04N 5/23229* (2013.01); *G06K 2009/00738* (2013.01); *H04N 2201/3252* (2013.01)

(58) Field of Classification Search
CPC ......... G06F 17/30038; G06F 17/30817; G06T 1/0007
See application file for complete search history.

(56) References Cited

U.S. PATENT DOCUMENTS

| | | | |
|---|---|---|---|
| 5,432,871 A | 7/1995 | Novik | |
| 6,384,862 B1 | 5/2002 | Brusewitz | |
| 6,434,265 B1 | 8/2002 | Xiong | |
| 6,486,908 B1 | 11/2002 | Chen | |
| 6,710,740 B2* | 3/2004 | Needham | G01S 19/48 342/357.46 |
| 6,711,293 B1 | 3/2004 | Lowe | |
| 6,788,333 B1 | 9/2004 | Uyttendaele | |
| 7,092,012 B2 | 8/2006 | Nakamura | |
| 7,403,224 B2* | 7/2008 | Fuller | G06F 17/30247 348/231.3 |
| 7,623,176 B2 | 11/2009 | Hoshino | |
| 7,983,502 B2 | 7/2011 | Cohen | |
| 8,044,992 B2 | 10/2011 | Kurebayashi | |
| 8,411,166 B2* | 4/2013 | Miyata | H04N 1/2112 348/231.3 |
| 8,443,398 B2 | 5/2013 | Swenson | |
| 8,606,073 B2 | 12/2013 | Woodman | |
| 8,644,702 B1 | 2/2014 | Kalajan | |
| 8,670,030 B2* | 3/2014 | Tanaka | G01S 19/49 348/136 |
| 8,842,197 B2* | 9/2014 | Singh | G06F 17/30265 348/231.3 |
| 8,890,954 B2 | 11/2014 | O'Donnell | |
| 8,896,694 B2 | 11/2014 | O'Donnell | |
| 9,001,217 B2 | 4/2015 | Kinoshita | |
| 9,019,396 B2* | 4/2015 | Kiyoshige | H04N 5/262 348/231.3 |
| 9,056,676 B1 | 6/2015 | Wang | |
| 9,106,872 B2 | 8/2015 | Tsurumi | |
| 9,342,534 B2* | 5/2016 | Singh | G06F 17/30265 |
| 9,412,278 B1 | 8/2016 | Gong | |
| 9,473,758 B1 | 10/2016 | Long | |
| 9,602,711 B2* | 3/2017 | Tanabiki | H04N 5/23206 |
| 9,602,795 B1 | 3/2017 | Matias | |
| 2002/0112005 A1* | 8/2002 | Namias | G06Q 10/107 709/206 |
| 2002/0122113 A1 | 9/2002 | Foote | |
| 2002/0191087 A1* | 12/2002 | Hashimoto | H04N 1/00244 348/231.3 |
| 2003/0085992 A1 | 5/2003 | Arpa | |
| 2004/0021780 A1* | 2/2004 | Kogan | H04N 1/32128 348/231.3 |
| 2004/0047606 A1* | 3/2004 | Mikawa | H04N 5/772 386/240 |
| 2004/0061667 A1 | 4/2004 | Sawano | |
| 2004/0075738 A1 | 4/2004 | Burke | |
| 2004/0135900 A1* | 7/2004 | Pyle | H04N 1/00912 348/231.3 |
| 2004/0169724 A1 | 9/2004 | Ekpar | |
| 2004/0174434 A1 | 9/2004 | Walker | |
| 2004/0239763 A1 | 12/2004 | Notea | |
| 2005/0033760 A1* | 2/2005 | Fuller | G06F 17/30247 |
| 2005/0062869 A1 | 3/2005 | Zimmermann | |
| 2005/0104976 A1* | 5/2005 | Currans | G06F 17/30265 348/231.5 |
| 2005/0134707 A1* | 6/2005 | Perotti | H04N 1/00342 348/239 |
| 2005/0289111 A1* | 12/2005 | Tribble | G06F 17/30979 |
| 2006/0050997 A1* | 3/2006 | Imamura | H04N 1/2112 382/312 |
| 2006/0195876 A1 | 8/2006 | Calisa | |
| 2007/0030358 A1* | 2/2007 | Aoyama | H04N 1/2112 348/231.2 |
| 2007/0120986 A1* | 5/2007 | Nunomaki | G11B 27/034 348/222.1 |
| 2007/0140662 A1* | 6/2007 | Nunomaki | G11B 27/105 386/224 |
| 2007/0279494 A1 | 12/2007 | Aman | |
| 2008/0094499 A1* | 4/2008 | Ueno | G01S 19/34 348/372 |
| 2008/0118100 A1* | 5/2008 | Hayashi | H04N 1/32112 382/100 |
| 2009/0118896 A1 | 5/2009 | Gustafsson | |
| 2009/0217343 A1 | 8/2009 | Bellwood | |
| 2009/0251558 A1* | 10/2009 | Park | H04N 5/23241 348/222.1 |
| 2009/0262206 A1 | 10/2009 | Park | |
| 2010/0045773 A1 | 2/2010 | Ritchey | |
| 2010/0097443 A1 | 4/2010 | Lablans | |
| 2010/0228418 A1 | 9/2010 | Whitlow | |
| 2010/0238304 A1* | 9/2010 | Miyata | H04N 1/2112 348/207.99 |
| 2010/0289924 A1* | 11/2010 | Koshikawa | H04N 1/32128 348/239 |
| 2010/0299630 A1 | 11/2010 | McCutchen | |
| 2011/0057783 A1* | 3/2011 | Yagi | B60R 1/00 340/436 |
| 2011/0115883 A1 | 5/2011 | Kellerman | |
| 2011/0141300 A1 | 6/2011 | Stec | |
| 2011/0261227 A1* | 10/2011 | Higaki | G03B 17/24 348/231.5 |
| 2012/0098981 A1 | 4/2012 | Ip | |
| 2012/0143482 A1 | 6/2012 | Goossen | |
| 2012/0199689 A1 | 8/2012 | Burkland | |
| 2012/0199698 A1 | 8/2012 | Thomasson | |
| 2012/0206565 A1 | 8/2012 | Villmer | |
| 2012/0242798 A1 | 9/2012 | Mcardle | |
| 2013/0058619 A1* | 3/2013 | Miyakawa | H04N 5/77 386/225 |
| 2013/0127903 A1 | 5/2013 | Paris | |
| 2013/0132462 A1 | 5/2013 | Moorer | |
| 2013/0176403 A1 | 7/2013 | Varga | |
| 2013/0182177 A1* | 7/2013 | Furlan | H04N 19/51 348/362 |
| 2013/0210563 A1 | 8/2013 | Hollinger | |
| 2013/0235226 A1* | 9/2013 | Karn | H04N 5/23241 348/220.1 |
| 2013/0314442 A1 | 11/2013 | Langlotz | |
| 2014/0037268 A1* | 2/2014 | Shoji | H04N 5/85 386/248 |
| 2014/0049652 A1 | 2/2014 | Moon | |
| 2014/0067162 A1 | 3/2014 | Paulsen | |
| 2014/0211987 A1 | 7/2014 | Fan | |
| 2014/0240122 A1* | 8/2014 | Roberts | G08B 21/182 340/539.11 |
| 2014/0267544 A1 | 9/2014 | Li | |
| 2014/0270480 A1 | 9/2014 | Boardman | |
| 2015/0055937 A1 | 2/2015 | Van Hoff | |
| 2015/0058102 A1 | 2/2015 | Christensen | |
| 2015/0134673 A1 | 5/2015 | Golan | |
| 2015/0186073 A1* | 7/2015 | Pacurariu | G06F 3/0655 710/74 |
| 2015/0189221 A1* | 7/2015 | Nakase | G11B 27/30 386/225 |
| 2015/0287435 A1* | 10/2015 | Land | H04N 19/46 386/241 |
| 2015/0296134 A1 | 10/2015 | Cudak | |
| 2015/0341550 A1 | 11/2015 | Lay | |
| 2015/0346722 A1 | 12/2015 | Herz | |
| 2015/0362917 A1 | 12/2015 | Wang | |
| 2016/0005435 A1 | 1/2016 | Campbell | |
| 2016/0055883 A1 | 2/2016 | Soll | |
| 2016/0104284 A1 | 4/2016 | Maguire | |
| 2016/0112713 A1 | 4/2016 | Russell | |

(56) References Cited

U.S. PATENT DOCUMENTS

| | | | |
|---|---|---|---|
| 2016/0117829 A1 | 4/2016 | Yoon | |
| 2016/0180197 A1 | 6/2016 | Kim | |
| 2016/0234438 A1 | 8/2016 | Satoh | |
| 2016/0239340 A1 | 8/2016 | Chauvet | |
| 2016/0269621 A1* | 9/2016 | Cho | H04N 5/23241 |
| 2016/0274582 A1 | 9/2016 | Banda | |
| 2016/0308813 A1 | 10/2016 | Kalajan | |
| 2016/0313732 A1 | 10/2016 | Seydoux | |
| 2016/0313734 A1 | 10/2016 | Enke | |
| 2016/0344983 A1* | 11/2016 | Yoshimura | H04N 7/185 |
| 2016/0366290 A1* | 12/2016 | Hoshino | H04N 1/00225 |
| 2017/0015405 A1 | 1/2017 | Chau | |
| 2017/0023939 A1 | 1/2017 | Krouse | |
| 2017/0085783 A1* | 3/2017 | Mukai | H04N 5/23293 |
| 2017/0094219 A1* | 3/2017 | Kim | G11B 27/30 |

OTHER PUBLICATIONS

U.S. Appl. No. 14/949,786, filed Nov. 23, 2015, entitled "Apparatus and Methods for Image Alignment".

U.S. Appl. No. 14/927,343, filed Oct. 29, 2015, entitled "Apparatus and Methods for Rolling Shutter Compensation for Multi-Camera Systems".

Benjamin Meyer et al: "Real-time Free-Viewpoint Navigation from Compressed Multi-Video Recordings", Proc. 3D Data Processing, Visualization and Transmission (3DPVT), May 31, 2010 (May 31, 2010), pp. 1-6, XP055091261, Extrait de l'Internet: URL:http://www.cg.cs.tu-bs.de/media/publications/meyer2010realtime.pdf [extrait le Dec. 3, 2013].

Farin et al., "Shortest Circular Paths on Planar Graphs," In 27th Symposium on Information Theory in the Benelux 2006, 8 pgs.

Felix Klose et al: "Stereoscopic 3D View Synthesis From Unsynchronized Multi-View Video", Proc. European Signal Processing Conference (EUSIPCO), Barcelona, Spain, Sep. 2, 2011 (Sep. 2, 2011), pp. 1904-1909, XP055091259, Extrait de l'Internet: URL:http://www.cg.cs.tu-bs.de/media/publications/eusipco2011_3d_synth.pdf [extrait le Dec. 3, 2013].

Foote J et al: 'FlyCam: Practical Panoramic Video and Automatic Camera Control', Multimedia and Expo, 2000. ICME 2000. 2000 IEEE International Conference on New York, NY, USA Jul. 30-Aug. 2, 2000, Piscataway, NJ, USA,IEEE, US, vol. 3, Jul. 30, 2000 (Jul. 30, 2000), pp. 1419-1422, XP010512772, DOI: 10.1109/ICME.2000.871033 ISBN: 978-0-7803-6536-0.

Hossein Afshari et al: "The PANOPTIC Camera: A Plenoptic Sensor with Real-Time Omnidirectional Capability", Journal of Signal Processing Systems, vol. 70, No. 3, Mar. 14, 2012 (Mar. 14, 2012), pp. 305-328, XP055092066, ISSN: 1939-8018, DOI: 10.1007/s11265-012-0668-4.

Lipski, C.: "Virtual video camera", SIGGRAPH '09: Posters On, SIGGRAPH '09, vol. 0, Jan. 1, 2009 (Jan. 1, 2009), pp. 1-1, XP055091257, New York, New York, USA DOI: 10.1145/1599301.1599394.

Mai Zheng et al: "Stitching Video from Webcams", Dec. 1, 2008 (Dec. 1, 2008), Advances in Visual Computing: 4th International Symposium, ISVC 2008, Las Vegas, NV, USA, Dec. 1-3, 2008. Proceedings, Part II, Springer Berlin Heidelberg, Berlin, Heidelberg, pp. 420-429, XP019112243, ISBN: 978-3-540-89645-6 le document en entier.

PCT International Search Report for PCT/EP2014/057352 dated Jun. 27, 2014, 3 pages.

PCT International Search Report for PCT/EP2014/058008 dated May 26, 2014, 3 pages.

PCT International Search Report for PCT/EP2014/061897 dated Sep. 15, 2014, 3 pages.

Perazzi et al., "Panoramic Video from Unstructured Camera Arrays," Eurographics, vol. 34 (2015), No. 2, 12pgs.

Ryan Jackson: 'Shooting 360-degree video with four GoPro HD Hero cameras / Ryan Jackson Photography' Feb. 8, 2011 (Feb. 8, 2011), XP055099926, Extrait de l'Internet: URL:http://punkoryan.com/2011/02/08/shooting-360-degree-video-with-four-gopro-hd-hero-cameras [extrait le Feb. 3, 2014] 37 pages.

Zhi et al., "Toward Dynamic Image Mosaic Generation With Robustness to Parallax," IEEE Transactions on Image Processing, vol. 21, No. 1, Jan. 2012, pp. 366-378.

* cited by examiner

STORAGE OF METADATA AND IMAGES

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

Field of the Disclosure

The present disclosure relates generally to capturing and storing of content such as audio, image, and/or video content and more particularly in one exemplary aspect to computer apparatus and methods for storing data beyond images, video, and audio content by a content capture device.

Description of Related Art

Metadata may be obtained when recording images, video, and/or audio content by a camera. The term metadata may typically refer to information associated with the camera and/or video and/or audio data captured by the camera. The metadata may originate from a variety of sources such as the camera (e.g., GoPro HERO 4), a software application (e.g., GoPro mobile device application), a device external to camera (e.g., heart rate sensor) and/or other sources. Some existing implementations provide for storing metadata in a separate file, and/or utilizing proprietary formats. It may be desirable to capture and store the metadata using the capture device when media data may not be collected.

SUMMARY

The present disclosure satisfies the foregoing needs by providing, inter alia, apparatus and methods for decoupling media and metadata acquisition and embedding metadata into electronic storage container. In one aspect of the disclosure, a computerized capture system is provided for obtaining an imaging content and metadata. The system may include one or more of an imaging sensor, one or more sensors other than the imaging sensor, a sensor interface, an information storage, one or more processors, and/or other components.

The imaging sensor may be configured to generated output signals. The output signals may convey the imaging content. The imaging content may include a series of images. The imaging sensor may include one or more of charge-coupled device sensor, active pixel sensor, complementary metal-oxide semiconductor sensor, N-type metal-oxide-semiconductor sensor, and/or other imaging sensors.

One or more sensors other than the imaging sensor may include a first sensor. The information storage may be configured to store metadata comprised of information provided by at least the first sensor. The sensor interface may be configured to obtain information from one or more sensors other than the imaging sensor. The obtained information may be relevant to one or more images within the series of images.

In some implementations, the system may include an enclosure. The enclosure may be configured to house one or more processors, and the information storage, and the sensor interface may include a wireless communications interface. The wireless communications interface may be configured to receive data communication from an external sensor disposed external to the enclosure. The data communication may be configured to convey the obtained information. In some implementations, the external sensor may include a global positioning system receiver. The global positioning system receiver may be configured to provide information related to location of the imaging sensor.

In some implementations, system may include an enclosure and a sensor disposed external to the enclosure. The enclosure may be configured to enclose one or more processors, the imaging sensor, and the sensor interface. A sensor disposed external to the enclosure may be coupled to the sensor interface. The sensor disposed external to the enclosure may be configured to provide the obtained information. The obtained information may be configured to characterize a physiological condition of a user of the system.

In some implementations, the sensor interface may include a wireless communications link. The metadata may be provided by a mobile communication device providing information related to location of the system via the wireless communications link.

One or more processors may be configured to detect a first event. The first event may be indicative of commencement of a metadata acquisition session. In some implementations, the system may include a microphone and the first event may be based on detection of audible signal including spoken keywords. In some implementations, the first event may be based on a timer expiration.

Metadata may be acquired during the metadata acquisition session. In some implementations, the imaging sensor, the sensor interface, and one or more processors may be embodied in a camera apparatus. In some implementations, the camera apparatus may include a tactile input element, and the first event may be based on activation of the tactile element. In some implementations, the metadata may include information generated internally by the camera apparatus and reflect parameters of the camera apparatus. In some implementations, the parameters may include one or more of motion of the imaging sensor, orientation of the imaging sensor, position of the imaging sensor, and/or other parameters.

In some implementations, the first sensor may be disposed remotely from the camera apparatus. The first sensor may communicate with one or more processors via a remote link.

In some implementations, the system may include a shutter and a lens optically coupled to the imaging sensor. In some implementations, the parameters may include one or more of white balance, contrast, saturation of one or more images within the series of images, imaging sensor temperature, shutter speed, imaging sensor gain, and/or other parameters.

One or more processors may be configured to detect a second event. The second event may be indicative of commencement of acquisition of a first portion of the imaging content for a time interval. In some implementations, the duration of the time interval may be configured based on expiration of a timer. The first portion of the imaging content may include one or more images within the series of images.

One or more processors may be configured to detect a third event. The third event may be indicative of cessation of the metadata acquisition session One or more processors may be configured to produce a session file. The session file may include at least the metadata obtained during the metadata acquisition session between the first event and the third event and a link to the first portion of the imaging content. The metadata acquisition session between the first event and the third event may be configured no smaller than the time interval. In some implementations, the session file may include links to other portions of the imaging content acquired during other time intervals within the metadata acquisition session between the first event and the third event. In some implementations, the session file may include the first portion of the imaging content, and the metadata acquisition session between the first event and the third event may be configured greater than the duration of the time interval.

In some implementations, the imaging content may include multiple video clips spaced by time intervals within the metadata acquisition session between the first event and the third event. One of the multiple video clips may include images of the series of images. The metadata may include sensor information within the metadata acquisition session between the first event and the third event.

In some implementations, the duration of the time interval may be configured based on a fourth event. The fourth event may include activation of a user interface module coupled to one or more processors.

In one aspect of the disclosure, an action camera apparatus is provided. The action camera apparatus may include one or more of an imaging sensor, a sensor other than the imaging sensor, a user interface, an information storage, one or more processors, and/or other components.

The image sensor may be configured to generate output signals. The output signals may convey a series of images. In some implementations, the series of images may include a first portion of images. The first portion of images may be characterized by a first imaging duration. The first imaging duration may be configured shorter than the metadata acquisition session between the first event and the third event.

The sensor other than the imaging sensor may be configured to obtain information. The information may be relevant to one or more images within the series of images. The user interface may be configured to receive one or more indications. The information storage may be configured to store metadata. The metadata may include the information obtained by the sensor.

One or more processors may be operably coupled to the imaging sensor, the sensor, and the information storage. One or more processors may be configured to, based on a detection of a first event by the user interface, transition one or more processors into sensor acquisition mode. The first event may be indicative of commencement of a metadata acquisition session during which metadata is acquired. The sensor acquisition mode may be characterized by sensor mode energy use.

One or more processors may be configured to, based on a detection of a second event, transition one or more processors into image acquisition mode. The second event may be indicative of commencement of a first capture period during which one or more images of the series of images are acquired. The image acquisition mode may be characterized by image mode energy use. The image mode energy use may require more power than the sensor mode energy use.

In some implementations, the series of images may include a second portion of images acquired during a second capture period. The second capture period may be spaced in time from the first capture period. The second capture period may be shorter than the metadata acquisition session between the first event and the third event.

One or more processors may be configured to, based on a detection of a third event, cause storing of information contained in the information storage in a container. The third event may be indicative of cessation of the metadata acquisition session. The container may include at least the metadata obtained during the metadata acquisition session between the first event and the third event and one or more images of the series of images. In some implementations, the first series of images may include a video segment, and the container may be configured in accordance with MP4 compatible multimedia container format.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

Figure 1A:
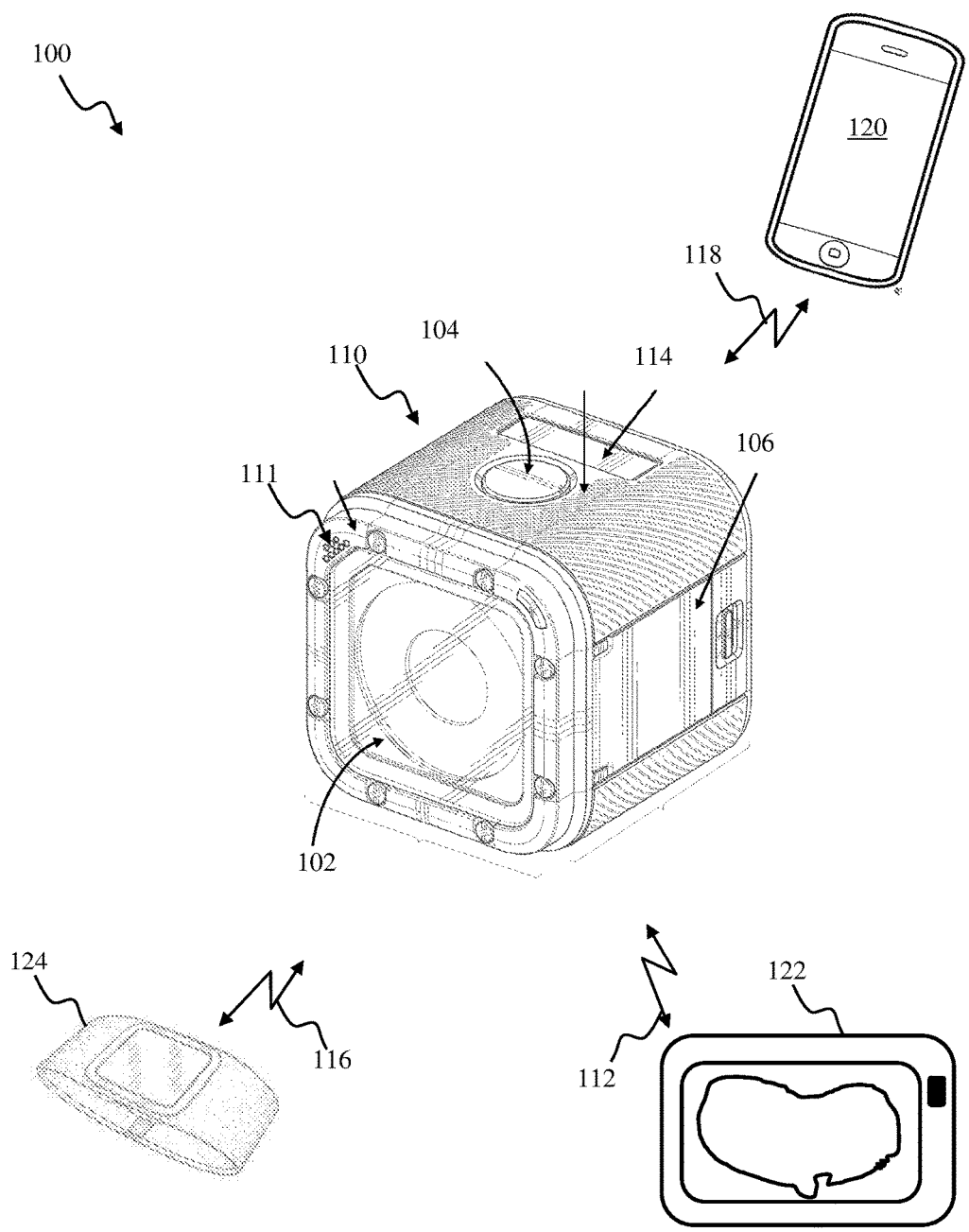
FIG. 1A is a functional block diagram illustrating a GoPro camera interfaced to metadata sources, in accordance with one implementation.

All Figures disclosed herein are ©Copyright 2016 GoPro Inc., All rights reserved.

DETAILED DESCRIPTION

Implementations of the present technology will now be described in detail with reference to the drawings, which are provided as illustrative examples so as to enable those skilled in the art to practice the technology. Notably, the figures and examples below are not meant to limit the scope of the present disclosure to a single implementation or implementation, but other implementations and implementations are possible by way of interchange of or combination with some or all of the described or illustrated elements. Wherever convenient, the same reference numbers will be used throughout the drawings to refer to same or like parts.

Where certain elements of these implementations can be partially or fully implemented using known components, only those portions of such known components that are necessary for an understanding of the present invention will be described, and detailed descriptions of other portions of such known components will be omitted so as not to obscure the disclosure.

In the present specification, an implementation showing a singular component should not be considered limiting; rather, the invention is intended to encompass other implementations including a plurality of the same component, and vice-versa, unless explicitly stated otherwise herein.

Further, the present disclosure encompasses present and future known equivalents to the components referred to herein by way of illustration.

Capture devices, such as action video cameras (e.g., GoPro HERO4 Silver) may be used in a variety of application where collecting data other than the video track may be of use. The non-video information (also referred to as the metadata) may include e.g., camera orientation, camera location, camera motion, time of day, season, ambient light conditions, weather parameters (e.g., wind speed, direction, humidity), user activity (e.g. running, biking, surfing), image acquisition parameters (e.g., white balance, image sensor gain, sensor temperature, exposure time, lens aperture, bracketing configuration (e.g., image exposure bracketing, aperture bracketing, focus bracketing), and/or other parameters), user statistics (heart rate, age, cycling cadence), Highlight Tags, image acquisition settings (e.g., white balance, field of view, gain, lens aperture, tonality curve used to obtain an image, exposure time, exposure compensation, and/or other image acquisition parameters, device and/or shot identification (ID) used in, e.g., multi-camera arrays, and/or practically any parameter that may be measured and/or recorded during video acquisition. In some implementations, metadata may include information related to proximity of other capture devices including e.g., device ID, status (e.g., recoding video, metadata, standby), range to the device, duration of device proximity occurrence, and/or other information.

Metadata information may be provided by one or more internal camera components and/or external components, e.g., as shown and described in detail with respect to FIGS. 1A-1B, below. Various sources of information may be utilized with the methodology of the present disclosure, including but not limited to telemetry pucks, vehicle telemetry information (e.g., brake pressure, engine RPM, vehicle speed, altitude, on board diagnostics parameters, and/or other vehicle parameters), information related to other capture devices that may occur in a vicinity (e.g., Bluetooth proximity information, radio frequency signal strength, ID of a neighboring capture device, and/or other information relating to other capture devices).

When acquiring video, e.g., using an action camera device such as GoPro HERO3, HERO4, additional information that may be related to the video acquisition session may be obtained and stored. In some implementations, such information may include camera sensor image acquisition parameters (e.g., exposure, white balance, gain), camera orientation, camera location, camera motion, time of day, season, ambient light conditions, audio information, evaluation of activity being filmed (e.g., surfing, biking), ambient temperature, user body parameters (e.g., heart rate, cadence) and/or any other parameter that may be conceivably related to the activity being filmed.

Existing metadata acquisition solutions often record metadata when video being obtained and/or recorded. Such configuration may provide an additional demand on computational and/or energy resources of the capture device.

The present disclosure provides for information storage container (referred to as "session file" and/or "session container") that may be configured to store metadata. In some implementations, the session container may be implemented as a multimedia container (e.g., MOV, MP4) configured to store metadata without video being present. In one or more implementations, the session container may be configured to store in a metadata track metadata captured over a given time duration together with and one or more content clips spanning a portion of the time duration. As used herein the term content may be used to refer to video, still images, bursts of images, audio, and/or a combination thereof. The content clips may be configured discontinues and/or continuous with one another. Combined duration of the clips may be configured shorter than the duration of the metadata track.

FIG. 1A illustrates a GoPro camera interfaced to metadata sources, in accordance with one implementation. The camera apparatus 110 of the system 100 may include one or more GoPro action cameras, e.g., HERO4 Silver. The camera apparatus 110 may house one or more internal metadata sources, e.g., video, inertial measurement unit, global positioning system (GPS) receiver component and/or other metadata source. In some implementations, the apparatus 110 may comprise a device described in detail in U.S. patent application Ser. No. 14/920,427, entitled "APPARATUS AND METHODS FOR EMBEDDING METADATA INTO VIDEO STREAM" filed on 22 Oct. 2015, the foregoing being incorporated herein by reference in its entirety. The apparatus 110 may comprise one or optical elements 102. Individual optical elements 102 may include, by way of non-limiting example, one or more of standard lens, macro lens, zoom lens, special-purpose lens, telephoto lens, prime lens, achromatic lens, apochromatic lens, process lens, wide-angle lens, ultra-wide-angle lens, fisheye lens, infrared lens, ultraviolet lens, perspective control lens, other lens, and/or other optical element.

The apparatus 110 may include one or more image sensors including, by way of non-limiting example, one or more of charge-coupled device (CCD) sensor, active pixel sensor (APS), complementary metal-oxide semiconductor (CMOS) sensor, N-type metal-oxide-semiconductor (NMOS) sensor, and/or other image sensor. The apparatus 110 may include one or more microphones (e.g., 111 in FIG. 1A) configured to provide audio information that may be associated with images being acquired by the image sensor.

The camera apparatus 110 may be interfaced to an external heartrate monitor device 124 via wireless link 116; to an external device 112 (comprising e.g., GPS receiver, cycling computer, metadata puck, and/or other device configured to provide information related to system 100 and/or its environment) via wireless link 112. The camera apparatus 110 may interface to an external user interface device 120 via link 118. In some implementations, the device 120 may correspond to a smartphone, a tablet computer, a phablet, a smart watch, a portable computer, and/or other device configured to receive user input and communicate information with the camera apparatus 110.

In one or more implementations, individual links 116, 112, 118 may utilize any practical wireless interface configuration, e.g., WiFi, Bluetooth (BT), cellular data link, ZigBee, near field communications (NFC) link, e.g., using ISO/IEC 14443 protocol, ANT+ link, and/or other wireless communications link. In some implementations, individual links 116, 112, 118 may be effectuated using a wired interface, e.g., HDMI, USB, digital video interface, display port interface (e.g., digital display interface developed by the Video Electronics Standards Association (VESA), Ethernet, Thunderbolt, and/or other interface).

In some implementations (not shown) one or more external metadata devices may interface to the apparatus 110 via a wired link, e.g., HDMI, USB, coaxial audio, and/or other interface. In one or more implementations, the camera apparatus 110 may house one or more sensors (e.g., GPS, pressure, temperature, heart rate, and/or other sensors). The metadata obtained by the camera apparatus 110 may be incorporated into the combined multimedia stream using any applicable methodologies including those described herein.

The user interface device 120 may operate a software application (e.g., GoPro Studio, GoPro App, and/or other application) configured to perform a variety of operations related to camera configuration, control of video acquisition, and/or display of video captured by the camera apparatus 110. An application (e.g., GoPro App) may enable a user to create short video clips and share clips to a cloud service (e.g., Instagram, Facebook, YouTube, Dropbox), perform full remote control of camera 110 functions, display live preview of video being captured for shot framing, mark key moments while recording with HiLight Tag, View HiLight Tags in GoPro Camera Roll for location and/or playback of video highlights, wirelessly use camera software, and/or perform other functions. Various methodologies may be utilized for configuring the camera apparatus 110 and/or displaying the captured information including these described in U.S. Pat. No. 8,606,073, entitled "BROADCAST MANAGEMENT SYSTEM", issued Dec. 10, 2013, the foregoing being incorporated herein by reference in its entirety.

By way of an illustration, the device 120 may receive user setting characterizing image resolution (e.g., 3840 pixels by 2160 pixels), frame rate (e.g., 60 frames per second (fps)), and/or other settings (e.g., location) related to the activity (e.g., mountain biking) being captured. The user interface device 120 may communicate the settings to the camera apparatus 110.

In some implementation, the user interface device 120 may communicate additional information (metadata) to the camera apparatus 110. By way of an illustration, the device 120 may provide location, speed, environmental information (e.g., weather conditions, temperature), and/or other information for use with presentation of the video being captured by the camera apparatus 110.

The user interface device 120 may be configured to receive (e.g., via the link 118) information related to the video being captured by the camera 110. In some implementations, the information may comprise full resolution (e.g., 3840 pixels by 2160 pixels at 60 fps) video stream and/or clips, lower-resolution (e.g., 1280×720 pixels) and/or lower frame rate (e.g., 30 fps) video stream and/or clips, video duration (e.g., elapsed recoding time), metadata (e.g., heart rate provided by the device 124), session container file containing metadata, metadata with thumbnails, and/or metadata with individual video clips and/or images, and/or other information. The user interface device 120 may provide metadata (e.g., position and/or speed provided by the device 120 GPS receiver) for use (e.g., overlay display) with the received video and/or incorporation into a multimedia stream.

The camera apparatus 110 may comprise a display 114 configured to provide information related to camera operation mode (e.g., image resolution, frame rate, capture mode (sensor, video, photo), connection status (connected, wireless, wired connection), power mode (e.g., standby, sensor mode, video mode), information related to metadata sources (e.g., heart rate, GPS), and/or other information. The camera apparatus 110 may comprise a display user interface component (e.g., button 114) configured to enable user to start, stop, pause, resume sensor and/or content capture. User commands may be encoded using a variety of approaches including but not limited to duration of button press (pulse width modulation), number of button presses (pulse code modulation) and/or a combination thereof. By way of an illustration, two short button presses may initiate sensor acquisition mode described in detail elsewhere; single short button press may be used to (i) communicate initiation of video and/or photo capture and cessation of video and/or photo capture (toggle mode); or (ii) video and/or photo capture for a given time duration or number of frames (burst capture). It will be recognized by those skilled in the arts that various user command communication implementations may be realized, e.g., short/long button presses.

The camera apparatus 110 may comprise a housing access component (e.g., door and/or cover 106). The component 106 may enable access to one or more internal ports of the apparatus 110 such as, e.g., power connector, storage component (e.g., memory card), communications interface (e.g., HDMI, USB, audio, and/or other interface).

Figure 1B:
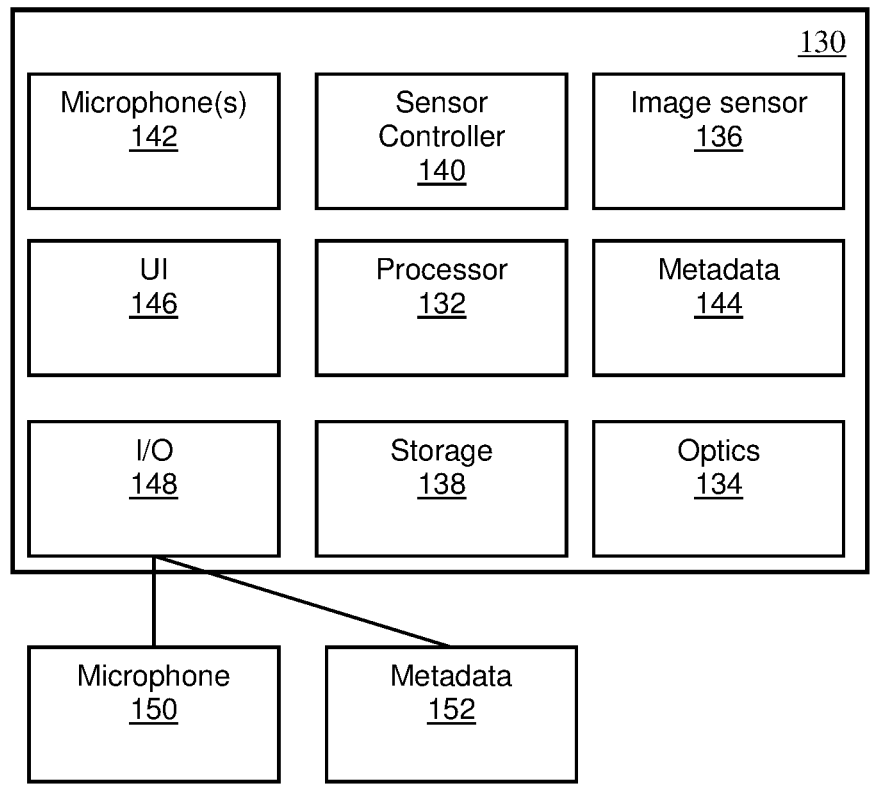
FIG. 1B is a functional block diagram illustrating a capture device for use with, e.g., system of FIG. 1A in accordance with one implementation.

FIG. 1B illustrates one implementation of a camera apparatus for collecting metadata and content. The apparatus of FIG. 1B may comprise a capture device 130 that may include one or more processors 132 (such as system on a chip (SOC), microcontroller, microprocessor, CPU, DSP, ASIC, GPU, and/or other processors) that control the operation and functionality of the capture device 130. In some implementations, the capture device 130 in FIG. 1B may correspond to an action camera configured to capture photo, video and/or audio content.

The capture device 130 may include an optics module 134. In one or more implementations, the optics module may include, by way of non-limiting example, one or more of standard lens, macro lens, zoom lens, special-purpose lens, telephoto lens, prime lens, achromatic lens, apochromatic lens, process lens, wide-angle lens, ultra-wide-angle lens, fisheye lens, infrared lens, ultraviolet lens, perspective control lens, other lens, and/or other optics component. In some implementations the module 134 may implement focus controller functionality configured to control the operation and configuration of the camera lens. The optics module may receive light from an object and couple received light to an image sensor 136. The image sensor 136 may include, by way of non-limiting example, one or more of charge-coupled device sensor, active pixel sensor, complementary metal-oxide semiconductor sensor, N-type metal-oxidesemiconductor sensor, and/or other image sensor. The image sensor 136 may be configured to capture light waves gathered by the optical module and to produce image(s) data based on control signals from the sensor controller 140. Optics module may comprise focus controller configured to control the operation and configuration of the lens. The image sensor may be configured to generate a first output signal conveying first visual information regarding the object. The visual information may include, by way of non-limiting example, one or more of an image, a video, and/or other visual information. The optical element, and the first image sensor may be embodied in a housing.

In some implementations, the image sensor module 136 may include without limitation, video, audio, capacitive, radio, vibrational, ultrasonic, infrared sensors, radar, LIDAR and/or sonar, and/or other sensory devices.

The apparatus 130 may include one or more microphones embodied within the camera (e.g., 142) and/or disposed external (e.g., 150) to the camera. Microphones may provide audio content information.

The apparatus 130 may include a sensor controller module 140. The module 140 may be used to operate the image sensor 136. The controller may receive image or video input from the image sensor 136; audio information from one or more microphones, such as 150, 142. In some implementations, audio information may be encoded using e.g., AAC, AC3, MP3, linear PCM, MPEG-H and or other audio coding format (audio codec). In one or more implementations of spherical video and/or audio, the audio codec may comprise a 3-dimensional audio codec, e.g., Ambisonics such as described at http://www.ambisonic.net/ and/or http://www.digitalbrainstorming.ch/db_data/eve/ambisonics/text01.pdf, the foregoing being incorporated herein by reference in its entirety.

The apparatus 130 may include one or more metadata modules embodied (e.g., 144) within the camera housing and/or disposed externally (152) to the camera. The processor 132 may interface to the sensor controller and/or one or more metadata modules 144. Metadata modules 144, 152 may include sensors such as an inertial measurement unit (IMU) including one or more accelerometers and/or gyroscopes, a magnetometer, a compass, a global positioning system (GPS) sensor, an altimeter, ambient light sensor, temperature sensor, and/or other sensors. The capture device 130 may contain one or more other metadata/telemetry sources, e.g., image sensor parameters, battery monitor, storage parameters, and/or other information related to camera operation and/or capture of content. Metadata modules 144, 152 may obtain information related to environment of the capture device and aspect in which the content is captured. By way of a non-limiting example, an accelerometer may provide device motion information, comprising velocity and/or acceleration vectors representative of motion of the capture device 130; the gyroscope may provide orientation information describing the orientation of the device 130, the GPS sensor may provide GPS coordinates, time, identifying the location of the device 130; and the altimeter may obtain the altitude of the camera 130. In some implementations, internal metadata module 144 may be rigidly coupled to the capture device 130 housing such that any motion, orientation or change in location experienced by the device 130 is also experienced by the metadata sensors 144. The sensor controller 140 and/or processor 132 may be operable to synchronize various types of information received from the metadata sources. For example, timing information may be associated with the sensor data. Using the timing information metadata information may be related to content (photo/video) captured by the image sensor 136. In some implementations, the metadata capture may be decoupled form video/image capture. That is, metadata may be stored before, after, and in-between one or more video clips and/or images. In one or more implementations, the sensor controller 140 and/or the processor 132 may perform operations on the received metadata to generate additional metadata information. For example, the microcontroller may integrate the received acceleration information to determine the velocity profile of the capture device 130 during the recording of a video. In some implementations, video information may consist of multiple frames of pixels using any applicable encoding method (e.g., H262, H.264, Cineform and/or other standard).

The apparatus 130 may include electronic storage 138. The electronic storage 138 may comprise a system memory module is configured to store executable computer instructions that, when executed by the processor 132, perform various camera functionalities including those described herein. The electronic storage 138 may comprise storage memory configured to store content (e.g., metadata, images, audio) captured by the apparatus.

The electronic storage 138 may include non-transitory memory configured to store configuration information and/or processing code configured to enable, e.g., video information, metadata capture and/or to produce a multimedia stream comprised of, e.g., a video track and metadata in accordance with the methodology of the present disclosure. In one or more implementations, the processing configuration may comprise capture type (video, still images), image resolution, frame rate, burst setting, white balance, recording configuration (e.g., loop mode), audio track configuration, and/or other parameters that may be associated with audio, video and/or metadata capture. Additional memory may be available for other hardware/firmware/software needs of the apparatus 130. The processing module 132 may interface to the sensor controller 140 in order to obtain and process sensory information for, e.g., object detection, face tracking, stereo vision, and/or other tasks.

The processing component 132 may interface with the mechanical, electrical sensory, power, and user interface 146 modules via driver interfaces and/or software abstraction layers. Additional processing and memory capacity may be used to support these processes. It will be appreciated that these components may be fully controlled by the processing module 132. In some implementation, one or more components may be operable by one or more other control processes (e.g., a GPS receiver may comprise a processing apparatus configured to provide position and/or motion information to the processor 132 in accordance with a given schedule (e.g., values of latitude, longitude, and elevation at 10 Hz).

The memory and processing capacity may aid in management of processing configuration (e.g., loading, replacement), operations during a startup, and/or other operations. Consistent with the present disclosure, the various components of the system 250 may be remotely disposed from one another, and/or aggregated. For example, one or more sensor components may be disposed distal from the capture device, e.g., such as shown and describe with respect to FIG. 1A. Multiple mechanical, sensory, or electrical units may be controlled be a learning apparatus via network/radio connectivity.

The apparatus 130 may include user interface (UI) module 146. The user interface module 146 may comprise virtually any type of device capable of registering inputs from and/or communicating outputs to a user. These may include, without limitation, display, touch, proximity sensitive interface, light, sound receiving/emitting devices, wired/wireless input devices and/or other devices. The UI module 146 may include a display, one or more tactile elements (e.g., buttons and/or virtual touch screen buttons), lights (LED), speaker, and/or other UI elements. The UI module 146 may be operable to receive user input and/or provide information to a user related to operation of the camera apparatus 130.

The apparatus 130 may include an input/output (I/O) interface module 148. The interface 148 may be is configured to synchronize the capture device 130 with other cameras and/or with other external devices, such as a remote control, a second capture device 130, a smartphone, a client device 120 of FIG. 1A and/or a video server. The module 148 may be configured to communicate information to/from various I/O components. In some implementations the module 148 may comprise a wired and/or wireless communications interface (e.g. WiFi, Bluetooth, USB, HDMI, Wireless USB, Near Field Communication (NFC), Ethernet, and/or other interfaces) configured to communicate to one or more external devices (e.g., devices 124, 122, 120 in FIG. 1A and/or metadata source 152 in FIG. 1B. In some implementations, the module 148 may interfaces with LED lights, a display 114, buttons 104 shown in FIG. 1A, microphones such as microphones 150 of FIG. 1B, speakers, and/or other I/O components. In one or more implementations, the interface 148 may interface to energy source, e.g., battery and/or DC electrical source. The communications interface of the apparatus 130 may include one or more connections to external computerized devices to allow for, inter alia, configuration, management of remote devices e.g., as described above with respect to FIG. 1A and/or with respect to FIGS. 2A-2B. The connections may include any of the wireless or wireline interfaces discussed above, and further may include customized or proprietary connections for specific applications. In some implementations, the communications interface may comprise a component (e.g., a dongle), comprising an infrared sensor, a radio frequency antenna, ultrasonic transducer, and/or other communications interfaces. In one or more implementation, the communications interface may comprise a local (e.g., Bluetooth, Wi-Fi) and/or broad range (e.g., cellular LTE) communications interface configured to enable communications between the capture device (e.g., 110 in FIG. 1A) and a remote device (e.g., 120 in FIG. 1A).

The apparatus 130 may include a power system that may be tailored to the needs of the application of the device. For example, for a small-sized lower power action camera, a wireless power solution (e.g. battery, solar cell, inductive (contactless) power source, rectification, and/or other) may be appropriate.

Figure 2A:
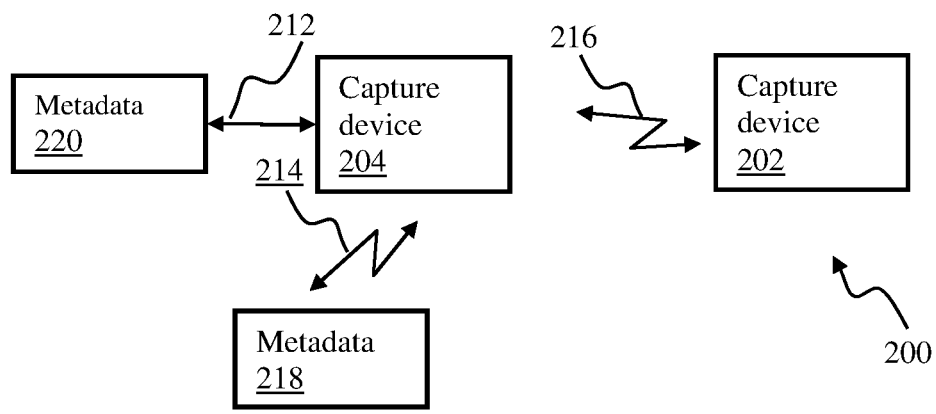
FIG. 2A is a functional block diagram illustrating a system for metadata and content acquisition in accordance with one implementation.
Figure 2B:
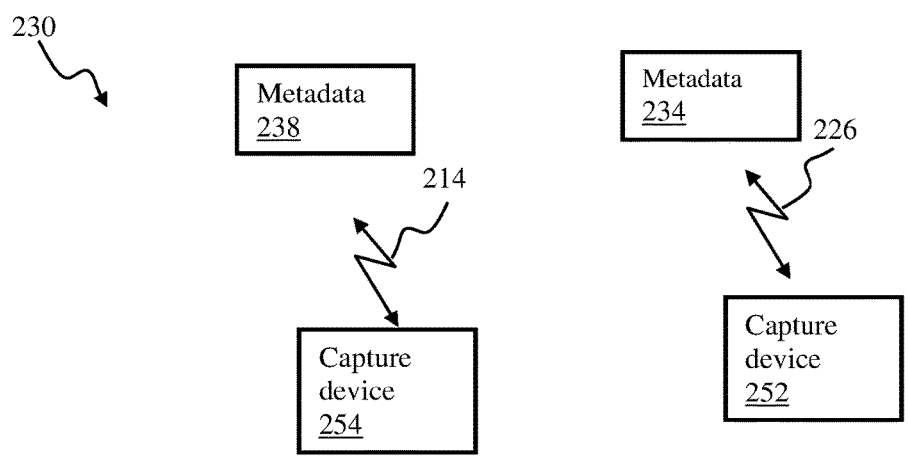
FIG. 2B is a functional block diagram illustrating a system for metadata acquisition comprising multiple capture devices, in accordance with one implementation.
Figure 2C:
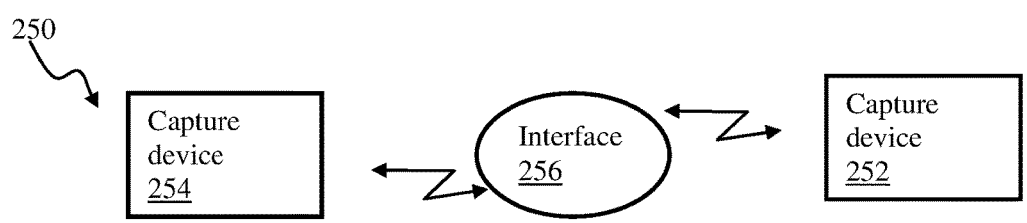
FIG. 2C is a functional block diagram illustrating a system for metadata communication between capture devices in accordance with one implementation.

FIGS. 2A-2C illustrate systems for metadata acquisition in accordance with some implementations. Systems such as shown and described with respect to FIGS. 2A-2C and/or capture devices of FIGS. 1A-1B may be utilized for metadata and content capture during an activity. In one or more implementations, the activity may be characterized by a location in space and duration in time, e.g. such as capturing video and/or photo during an event such as concert, performance, sports event, construction site, social gathering, and/or other event where a capture device may remain at a given location for a period of time. In event recording applications, the metadata container may provide information related to a timeline of the event, environmental conditions, proximity of other capture devices and/or other information. In some implementations, the activity may be characterized by a trajectory in space, during endurance car race, bike ride/race, mountaineering, skiing/snowboarding, hiking, boating, skydiving, flight of an aerial vehicle, and/or other activity where capture device may move in space.

FIG. 2A illustrates a system 200 comprised of two capture devices. Individual capture devices 202, 204 may correspond to an action camera 110 of FIG. 1A, device 130 described with respect to FIGS. 1A-1B, respectively, and/or other device configured to capture content and metadata. The system of FIG. 2A may be utilized by a user to capture metadata and content while performing an activity e.g., traversing a trajectory 500, shown and described with respect to FIG. 5, on a bicycle and/or other vehicle, surfing, mountaineering, chiming, hiking, flying an aerial vehicle, and/or partially any activity that may be characterized by a trajectory. In some implementations, the activity may include collecting metadata and/or content using a stationary capture device (e.g., during an event, a show, at a construction site, and/or other activity characterized by time duration.

As shown in FIG. 2A, the capture device 204 may be interfaced to external metadata sources 220, 218 via links 212, 214, respectively. Metadata sources 220, 218 may include any applicable metadata source, e.g., 124, 122, 120, 152 described herein, and/or other sources including e.g., GPS receiver, cycling computer, car computer, metadata puck, a mobile device (e.g., smart phone providing traffic information), and/or other device configured to provide information related to activity being performed. In one or more implementations, individual links 212, 214 may utilize any practical wireless and/or wired interface. By way of a non-limiting illustration, the metadata source 220 may comprise a vehicle computer (e.g., cycling computer, car computer) interfaced to the capture device 204 via a serial bus interface 212. The metadata source 218 may comprise a heart rate monitor worn by a user. The source 218 may communicate with the capture device 204 via wireless link 214 (e.g., WiFi, BT, NFC, ANT+, and/or other link). It will be recognized by those skilled in the arts that these examples serve to illustrate applications of the disclosure and various other metadata source configurations may be utilized with a capture device (e.g., multiple wired and/or wireless sources connected to a given capture device). As described with respect to FIGS. 1A-1B, capture devices (e.g., 202, 204) may include one or more internal metadata sources. In one or more implementations, such metadata sources may include one or more sensors e.g., GPS, pressure, temperature, heart rate, and/or other sensors. The metadata obtained by the capture devices 202, 204 may be incorporated into the combined multimedia stream using any applicable methodologies including those described herein.

Individual capture device 202, 204 may be configured to store captured metadata and/or content in a session file and/or multimedia file. In some implementations, the metadata and the content may be stored internally by a respective capture device (e.g., content captured by the device 204 may be stored on internal storage of the device 204).

In order to obtain context for the stored content, metadata may be utilized. In some implementation, wherein metadata and content capture may be performed by multiple capture devices, metadata may be communicated from one device to another. By way of an illustration, metadata information available to device 204 may be communicated to device 202 via remote link 216 (e.g., WiFi, BT, NFC, ANT+, and/or other link). In some implementations, wherein device 202 may include internal metadata source(s) that may provide data relevant to activity being captured (e.g., IMU data), such metadata information may be communicated to device 204 via the link 216.

FIG. 2B illustrates a system comprising two capture devices. Individual capture devices 252, 254 in FIG. 2B may be coupled to one or more metadata sources 238, 234 via wireless communication links 214, 226. In one or more implementations, individual links 226, 214 may utilize any practical wireless interface, e.g., (e.g., WiFi, BT, NFC, ANT+, and/or other link). By way of a non-limiting illustration, the metadata source 238 may comprise a heart rate sensor; the metadata source 234 may correspond to a mobile communications device (smartphone, cycling computer and/or other device). Metadata and/or content captured by capture devices 254, 252 in FIG. 2B may be stored by a respective device (e.g., heart rate stored by the device 254, cycling statistics by the device 252). In some implementations, individual devices 252, 254 may correspond to one or more devices 110, 1130 of FIGS. 1A-1B, 202, 204 of FIG. 2A and/or other devices.

FIG. 2C illustrates a system 250 configured to enable information transfer between two capture devices 252, 254. Individual capture devices 252, 254 may correspond to any applicable capture device including devices 110, 130, 202, 204, described with respect to FIGS. 1A-1B, 2A-2B. In FIG. 2B device 254 may be coupled to device 252 via interface 256. In some implementations, the interface 256 may comprise a wireless (e.g., WiFi access point) or a wired interface (e.g., USB hub). The system 250 may be utilized post capture by a user of capture device 254 in order to obtain a session metadata file comprising information captured by the device 254 and metadata captured by another capture device, e.g., 252. By way of an illustration, two users may use their own capture devices during a hike/climb, and/or a bike ride. After the activity (post capture) users may link their capture devices via a WiFi hub. Devices may be configured to communicate metadata related to the activity. Metadata received from another capture device (e.g., 254) may be combined with the metadata captured by the device 252 and stored by the device 252.

Referring now to FIGS. 3A-4C metadata container is described in accordance with some implementations of the disclosure. Information storage configurations shown and described with respect to FIGS. 3A-4C may utilized for metadata and content capture during an activity. In one or more implementations, the activity may be characterized by a location in space and duration in time, e.g. such as capturing video and/or photo during an event such as concert, performance, sports event, construction site, social gathering, and/or other event wherein a capture device may remain at a given location for a period of time. In some implementations, the activity may be characterized by a trajectory in space, during endurance car race, bike ride/race, mountaineering, skiing/snowboarding, hiking, boating, skydiving, flight of an aerial vehicle, and/or other activity where capture device may move in space.

Figure 3A:
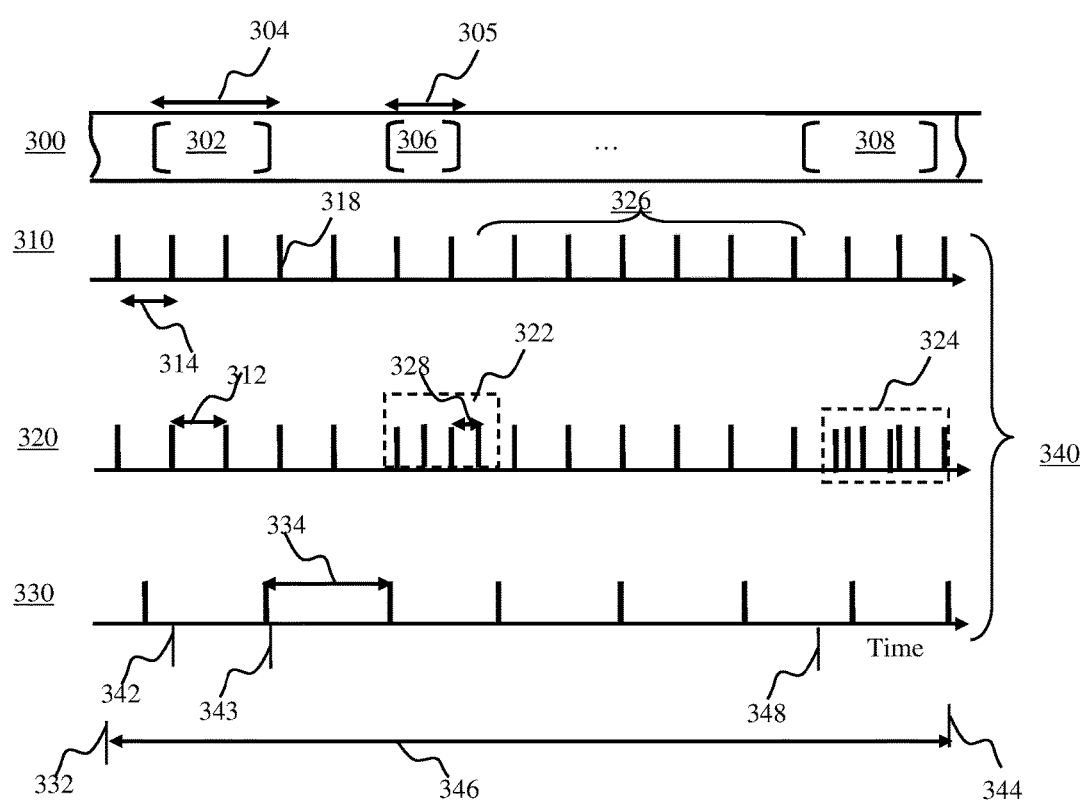
FIG. 3A is a graphical illustration depicting continuing collection of metadata contemporaneously with intermittent acquisition of content by e.g., a capture device of FIG. 1B in accordance with one implementation.

FIG. 3A illustrates continuing collection of metadata contemporaneously with intermittent acquisition of content by e.g., a capture device of FIGS. 1A-1B in accordance with some implementations. Timeline 310 denotes a content track 300 comprising content portions 302, 304, 308 or other content. In some implementations, individual portions 302, 304, 308 may correspond to video clips characterized by duration 304, 305, bursts of photos, audio recordings, and/or combination thereof. Individual video clips may be captured within time duration 346. Individual video clips may be spaced form one another by time intervals. In some implementations, two or more clips may occur adjacent to one another. Content track may comprise video frames characterized by resolution (e.g., 4000×3000 pixels, 1920×1080 pixels and/or other resolution) and a frame rate. In some implementations, the framerate may be selected between 20 fps and 240 fps. It will be recognized by those skilled in the arts that the above values are provided for illustrating methodology of the present disclosure and other resolution and/or framerate values may be utilized commensurate with a given application.

Timelines 310, 320, 330 denote metadata records (also may be referred as channels) that may be captured within the time duration 346. Metadata channels 310, 320, 330 may collectively form a metadata track 340. Individual vertical marks (e.g., 318) denote time instances of metadata capture for a given channel. Individual metadata channel may correspond to a parameter provided by a metadata source (e.g., 124, 122, 120 in FIG. 1A, 153, 154, 160, 162 in FIG. 1B-2A), and/or other source. Some metadata channels may be characterized by sampling rate that may be slower than the framerate of the context track (e.g., heart rate may be updated at 1 Hz, position information may be provided at 10 Hz for video at framerate of 30 fps). Some metadata channels may be sampled at sampling rate that may be selected to exceed the framerate, e.g., camera acceleration and/or orientation may be sampled at a rate selected between 1000 Hz and 10000 Hz in order to, e.g., provide image stabilization information. Some metadata channels (e.g., gain, white balance) may be obtained at sampling rate that may be selected comparable to the framerate (e.g., once per frame, or once per several frames).

Returning now to FIG. 3A, time instance 332 may indicate commencement of metadata and/or content capture; time instance 344 may indicate cessation of metadata and/or content capture. Information presented by timelines 310, 320, 330 may correspond to respective metadata sources, e.g., speed, acceleration, GPS position, heart rate, elevation, and/or other information. Information presented by individual timelines 310, 320, 330 may be characterized by a respective update rate (sampling intervals depicted by arrows 314, 334). In some implementations (e.g., such as shown by timeline 310), the sampling interval (e.g., 314) may remain a constant during metadata recording duration. In some implementations (e.g., such as shown by timeline 320), the sampling interval may be adjusted based on evaluation of metadata value(s) for that channel (e.g., 320) and/or other channels. By way of an illustration, based on a determination that one or more metadata channel values may breach one or more thresholds (e.g., acceleration above a given value indicative of a jump, and/or tight turns), the sampling rate of one or more metadata channels may be adjusted, e.g., as shown by a decrease of the sampling interval of channel 320 during time instances denoted by broken line rectangles 322, 324. Length of arrow 328 is smaller than length of arrow 312 indicating a higher sampling rate (shorter sample interval). In some implementations, duration of a session (346 in FIG. 3A) may vary and/or be configured in accordance with parameters of a given application (e.g., target file size (e.g., 2 gigabytes GB), target duration (e.g., 3600 seconds) and/or other parameters.

Figure 5:
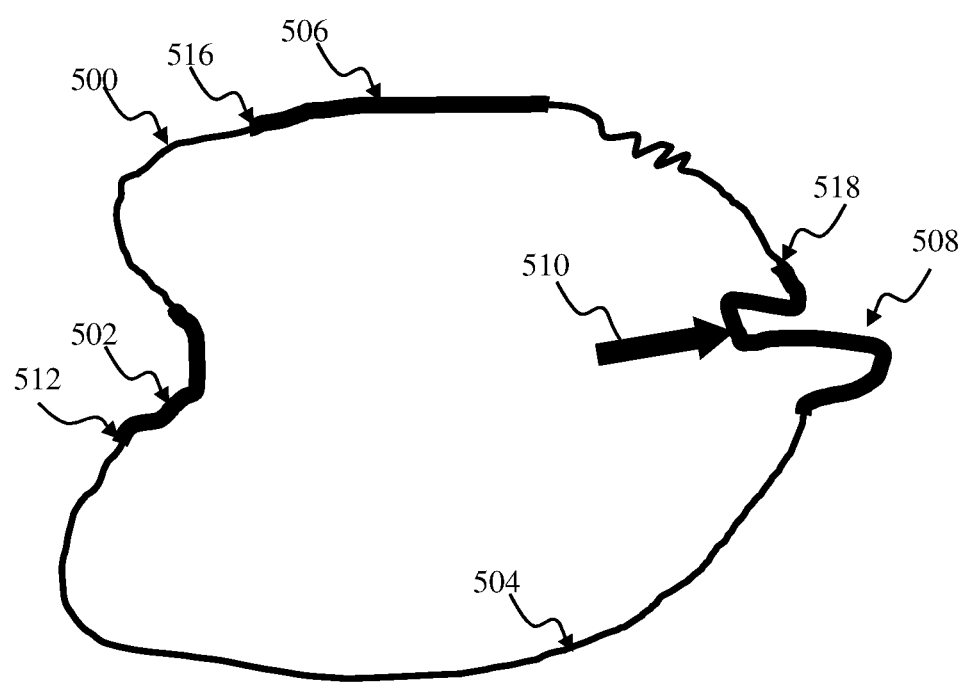
FIG. 5 is a graphical illustration depicting a trajectory traversal by a capture device during metadata and content acquisition in accordance with one implementation.

By way of an illustration, a user may use a capture system 100 of FIG. 1A while riding a bike along a trajectory 500 shown in FIG. 5. At time instant 332, the system 100 may commence metadata capture and/or recording. In some implementations, the commencement may be caused based on an event, e.g., double press of button (e.g., 104 in FIG. 1A), speed above a given threshold, location change, audible indication (e.g., "START METADATA") and/or other event. At time instants 342, 348 the system 100 may commence video capture and/or recording. In some implementations, the commencement may be caused based on an event, e.g., press of button (e.g., 104 in FIG. 1A), detecting speed, acceleration and/or other parameter breaching a given threshold, location change, audible indication (e.g., "START VIDEO") and/or other event. Video may be captured for a given time duration (e.g., 304, 305). In some implementations, the video clip duration may be based on a detection of another event, e.g., 343 corresponding to e.g., another press of the button, detecting speed, acceleration and/or other parameter breaching another threshold, audible indication (e.g., "STOP VIDEO") and/or other event. By way of a non-limiting illustration, a rider may configure the capture system to automatically instantiate video clip recording when speed and/or acceleration may exceed given criteria. In one or more implementations, the video clip duration may be pre-configured by a user (e.g., 15 seconds), and/or selected based on evaluation of past durations (e.g., average of last 3, repeat of last duration, and/or other operations), based on analysis of metadata (e.g., select clip duration corresponding to a given acceleration and/or speed range, location and/or other criteria). By way of a non-limiting illustration when riding the trajectory 500 over several repetitions, the capture system may determine location 516 and instantiate recording of video for duration 305.

As illustrated in FIG. 3A, metadata capture interval may be decoupled from content capture interval(s). Specifically, metadata may be continuously captured for the duration of the interval 346 including during interval 326 in between content clips 308, 306 Such metadata capture and/or storage may enable to obtain a context for content being acquired during activity. In some implementations, the context may include trajectory associated with content. Referring now to FIG. 5, continuing acquisition of GPS location and/or speed may enable to obtain trajectory for the whole ride, shown by thin curve 500 in FIG. 5. Trajectory portions indicated by bold curve segments 502, 506, 508 may correspond to time intervals when content may be acquired (e.g., video clips 302, 306, 308 in FIG. 3A). As may be seen form FIG. 5, addition activity information captured in between video clips (e.g., rider position shown by thin curve, e.g., segment denoted by arrow 504) may provide a fuller description of the activity. In some implementations, the metadata capture for the duration of the activity may enable determination of various statistics such as distance travel, calories burned, average cadence, elevation loss/gain, and/or other parameters. Arrows 512, 518 in FIG. 5 may correspond to instances of video recording initiation, e.g., denoted 342, 348 in FIG. 3A. Arrow 510 may indicate present location of the rider.

The metadata track may be stored in a session container. The term session may be used to describe data collection during an activity, e.g., navigation of the trajectory 500 of FIG. 5 during time duration 346 of FIG. 3A. In some implementations, the session container may be configured using a multimedia container format, e.g., MP4, MOV. In one or more implementations, such as shown and described in FIG. 4A, the session container may include metadata track while video and/or audio track may remain blank. The session container 400 may include metadata track 408 consisting of one or more metadata channels (e.g., channels 330, 310, 320 in FIG. 3A). The metadata track 408 may include links 410 to one or more captured content elements (e.g., video clips 302, 306 in FIG. 3A, images 352, 356 in FIG. 3B, and/or other content elements). Links 410 may contain information related to time, file name, content clip identification ID) and/or other information configured to enable a content playback application to access the respective content element. Broken line rectangles 402, 404, 406 in FIG. 4A may denote portions of the metadata track corresponding to captured content element. In some implementations, the session container (e.g., 400 in FIG. 4A) may be configured using a multimedia container format, e.g., MP4, MOV wherein video and/or audio track may remain blank.

In some implementations, a link (e.g., the link 410) may be configured using indexable unit information that may be present in a header of a video file (e.g., MOV/MP4). In one or more implementations wherein the video container may be configured using a group of pictures (GOP) compression (e.g., H.264), the indexable unit may correspond to a video frame.). In some implementations the indexable unit may correspond to multiple frames and/or time slice in excess of the frame duration; the indexable unit may include a start time (in the MOV/MP4 time-base) and the time duration (time slice) that the indexable unit represents. If the timebase is configured in frames, a file with a 15-frame GOP compression, may be configured to include an entry at time 0, with length 15, entry at time 15 with length 15, entry at time 30 with length 15, and/or other entries.

Individual metadata channels of the session container (e.g., 400) may be characterized by sampling rate and/or sampling interval. In some implementations, one or more metadata channels may be stored with the respective video using, e.g., metadata storage methodology described in detail in U.S. patent application Ser. No. 14/920,427, entitled "APPARATUS AND METHODS FOR EMBEDDING METADATA INTO VIDEO STREAM" filed on 22 Oct. 2015, incorporated supra. Metadata information stored with the video may be characterized by a given metadata sampling rate. In some implementations, the metadata sampling rate of a given metadata source (e.g., IMU) stored with the video content may be greater than sampling rate of the metadata stored in a session container. By way of an illustration, camera motion information provided by an IMU may be acquired at 1000 Hz rate. A metadata track of a video storage container may be used to store motion information at full resolution (e.g., 1000 HZ); a session container may be configured to store a sub-sampled version of the motion information (e.g., at 10 Hz) in order to reduce container storage size and/or processing load associated with decoding and/or interpreting session container information. Storing video and metadata (e.g., camera motion information) at high resolution (e.g., comparable or greater or equal frame rate) may provide for improved image manipulation, e.g., image stitching such as described in detail in U.S. patent application Ser. No. 14/949,786 entitled "APPARATUS AND METHODS FOR IMAGE ALIGNMENT" filed on 23 Nov. 2015, rolling shutter correction e.g., image stitching such as described in detail in U.S. patent application Ser. No. 14/927,343 entitled "APPARATUS AND METHODS FOR ROLLING SHUTTER COMPENSATION FOR MULTI-CAMERA SYSTEMS" filed on 29 Oct. 2015, and/or other image manipulation operations. In some implementations, session container may be configured to store metadata information at the source resolution (e.g., 1000 Hz in the above example).

Figure 3B:
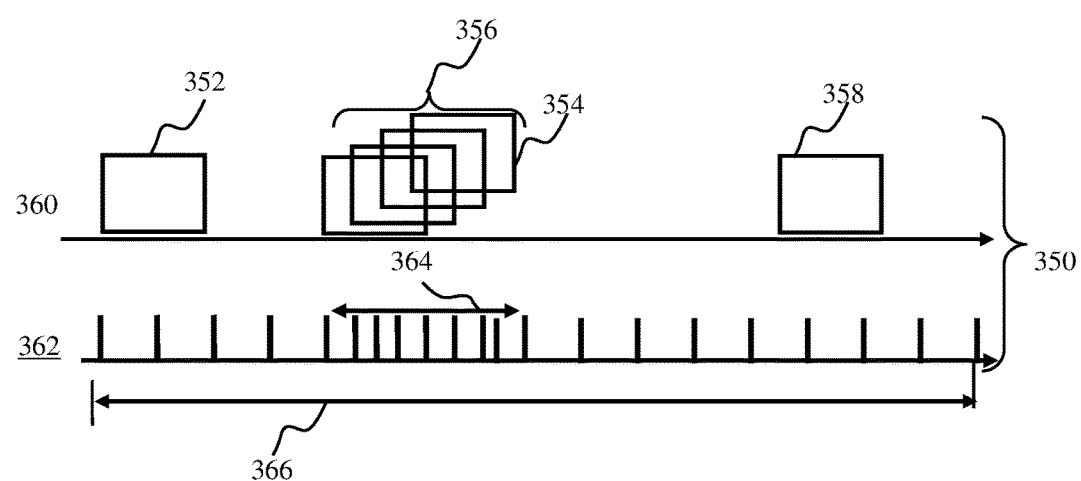
FIG. 3B is a graphical illustration depicting continuing collection of metadata contemporaneously with discontinuous image acquisition by e.g., a capture device of FIG. 1B in accordance with one implementation.

FIG. 3B illustrates continuing collection of metadata contemporaneously with discontinuous image acquisition by e.g., a capture device of FIG. 1B in accordance with one implementation. Information may include content track 360 and metadata track 362 stored in a session container 350.

The timeline 360 illustrates the content track comprising content portions 352, 354, 358 or other portions captured during time interval 366. In some implementations, individual portions 352, 356, 358 may include one or more images and/or image burst (e.g., portions 356 comprised of multiple images e.g., 354). Individual portions 352, 356, 358 may be spaced form one another by time intervals. In some implementations, two or more clips may occur adjacent to one another. It will be recognized by those skilled in the arts that content description of FIGS. 3A-3B is provided to illustrate principles of the disclosure. Various other content configurations may be utilized, e.g., audio content, content track consisting of video, photo, and photo burst portions (e.g., portions 302, 306, 308), and/or other configurations.

Metadata track 362 may include one or more metadata channels (e.g., such as 310, 320, 330 described above with respect to FIG. 3A). Metadata track 362 may include metadata information collected over time duration 366. In some implementations, sampling interval of one or more metadata channels may be adjusted based on evaluation of metadata value(s) for that channel and/or other channels. By way of an illustration, based on detection of an event by, e.g., determining that one or more metadata channel values may breach one or more thresholds (e.g., acceleration above a given value indicative of a jump, and/or tight turns), the sampling rate of one or more metadata channels may be adjusted, e.g., as shown by a decrease of the sampling interval of channel during duration denoted arrow 364. In some implementations, detection of the event may cause change in the content collection configuration, e.g., collection of a burst 356 of images.

Information of the session 350 may be stored a session container. The session container may include the metadata track 362 and the content track 360. In some implementations, the session container (e.g., 400 in FIG. 4A) may be configured using a multimedia container format, e.g., MP4, MOV wherein video and/or audio track may remain blank.

Figure 4A:
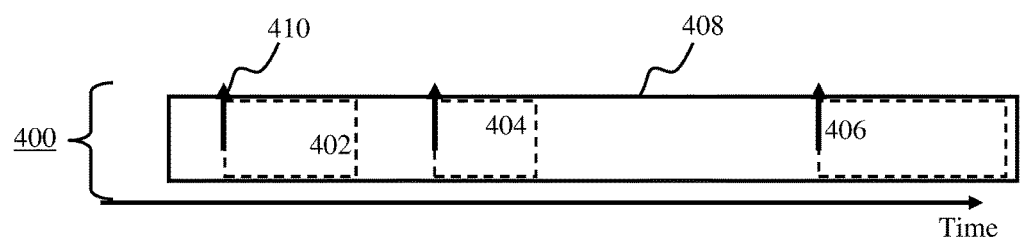
FIGS. 4A-4C illustrate session container for storing metadata in accordance with one or more implementations.
Figure 4B:
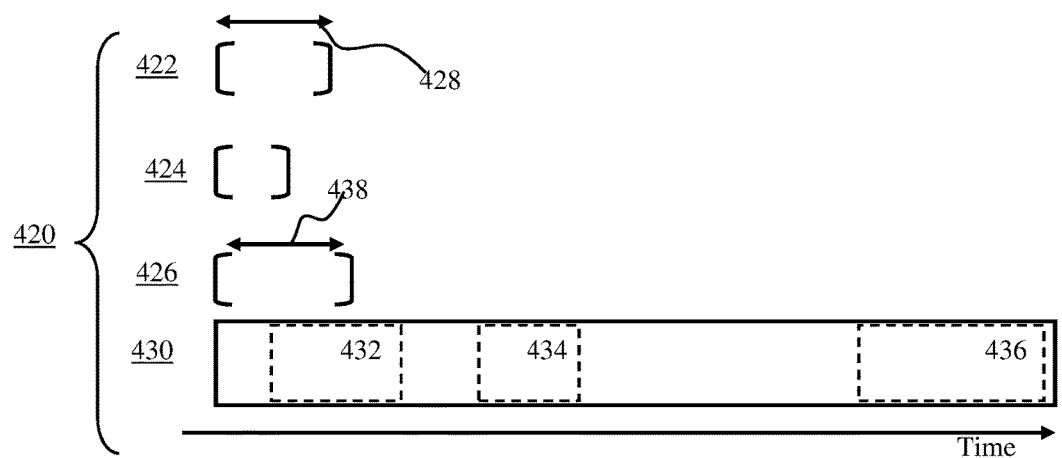
Figure 4C:
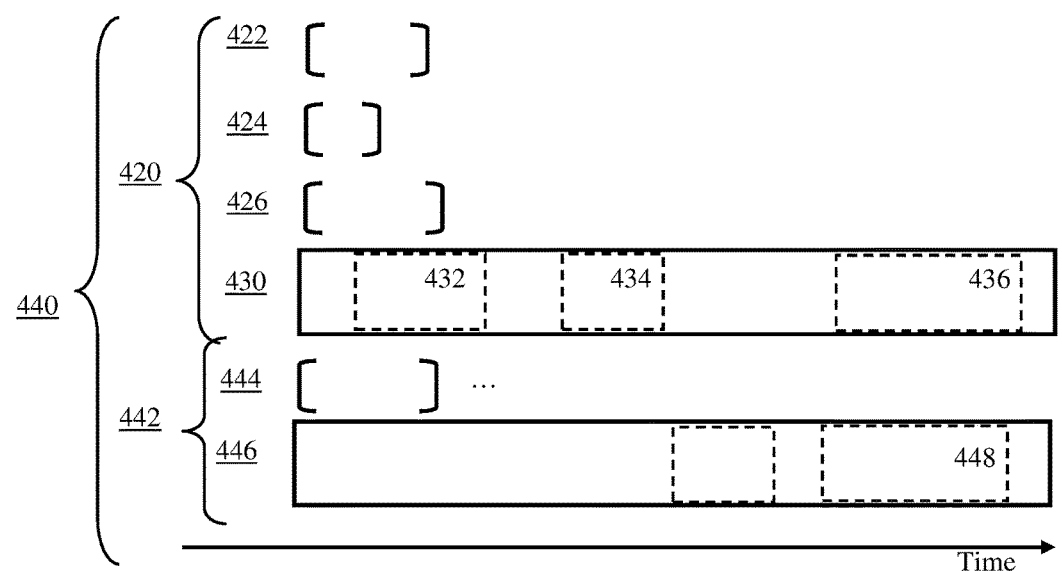

FIGS. 4B-4C illustrate session container configurations for storing metadata in accordance with one or more implementations. Session container 420 of FIG. 4B may include a metadata track 430 and multiple content elements (e.g., audio, video clips, photos, bursts of photos, and/or a combination thereof) 422, 424, 426. Individual elements 422, 424, 426 may be characterized by a duration, e.g., denoted by arrows 428, 438. Broken line rectangles 432, 434, 436 in the metadata track denote time instances and duration associated with the content clips 422, 424, 426. The session container 420 may include links configured to relate metadata track to the content clips during playback.

In some implementations the metadata session container may be configured to store multiple sessions from one or multiple cameras, e.g., such as shown and described with respect to FIG. 4C, below. Session container 440 may include the session 420 of FIG. 4B and one or more other session containers, e.g., 442 in FIG. 4C. Session containers 420, 442 may correspond to information obtained with two capture devices. Session containers 420, 442 may include metadata information 430, 446 for the duration of an activity. Session containers 420, 442 may include one or more content segments 422, 424, 426, 444. Time intervals corresponding to time when the content segments may have occurred during the activity may are denoted by broken line rectangles 432, 434, 436, 448, respectively. Some content segments may overlap in time (e.g., segments 426, 444 as indicated by rectangles 436, 448 in FIG. 4C).

Figure 6A:
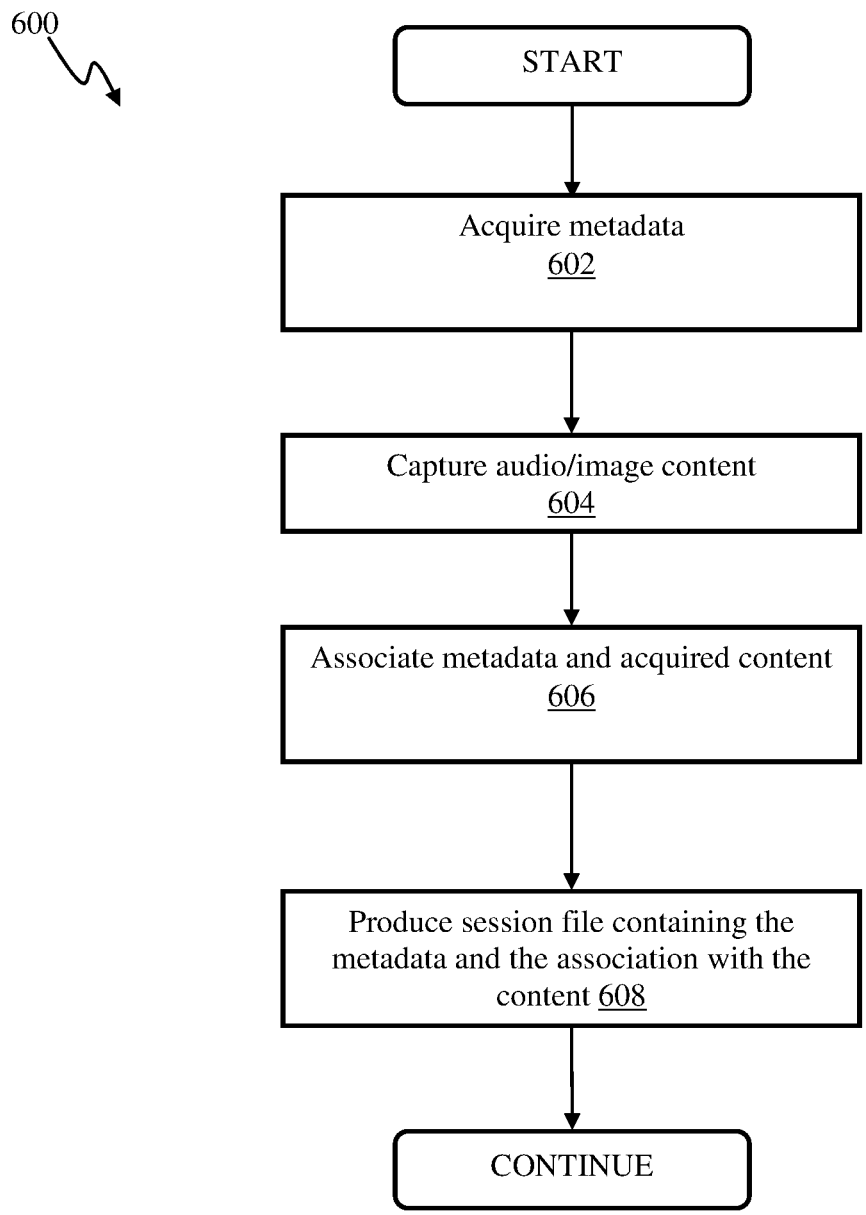
FIG. 6A is a logical flow diagram illustrating obtaining a session container for storing multimedia and content information in accordance with one implementation.
Figure 6B:
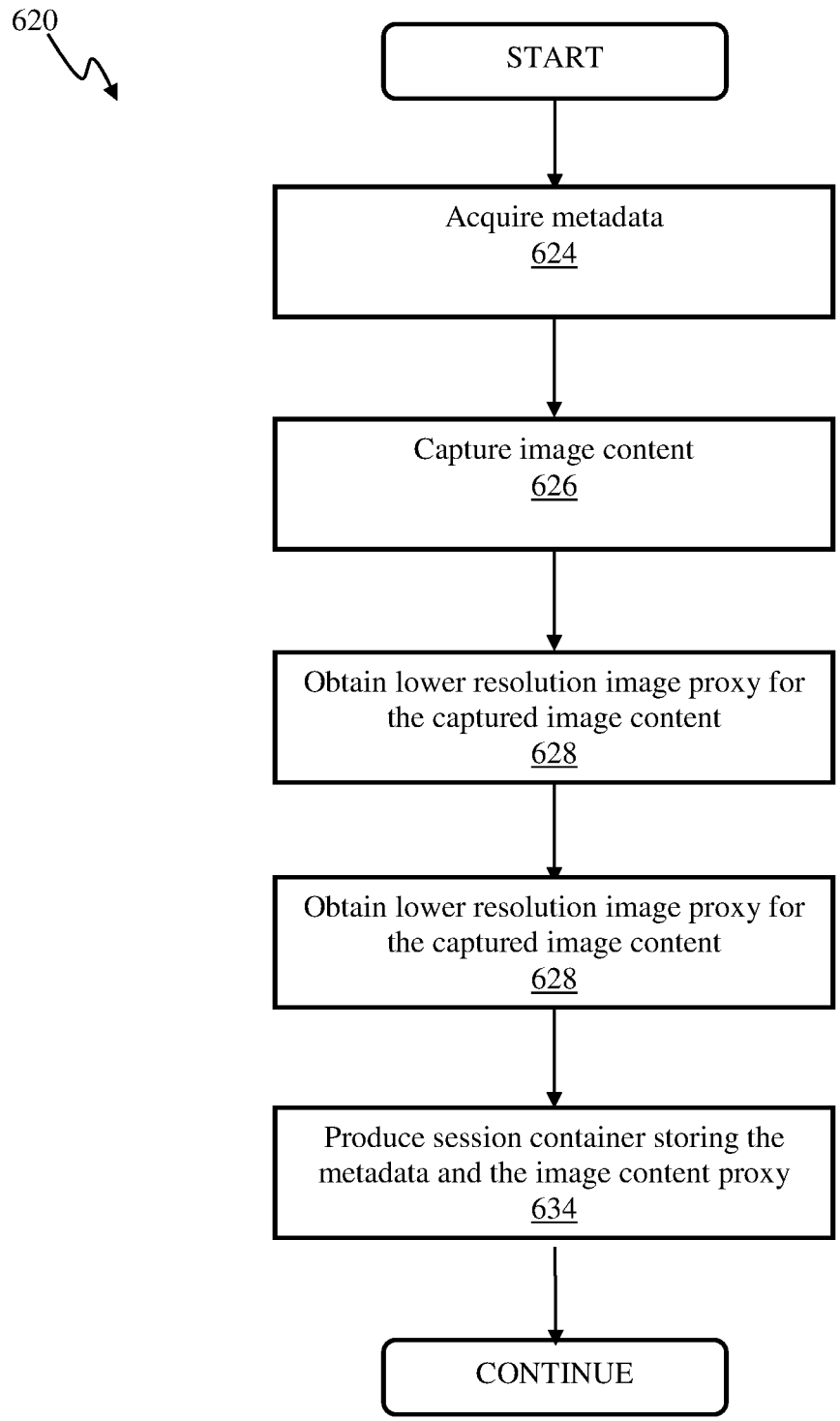
FIG. 6B is a logical flow diagram illustrating a method of operating a capture device for obtaining a session container for storing multimedia and content information in accordance with one implementation.
Figure 7:
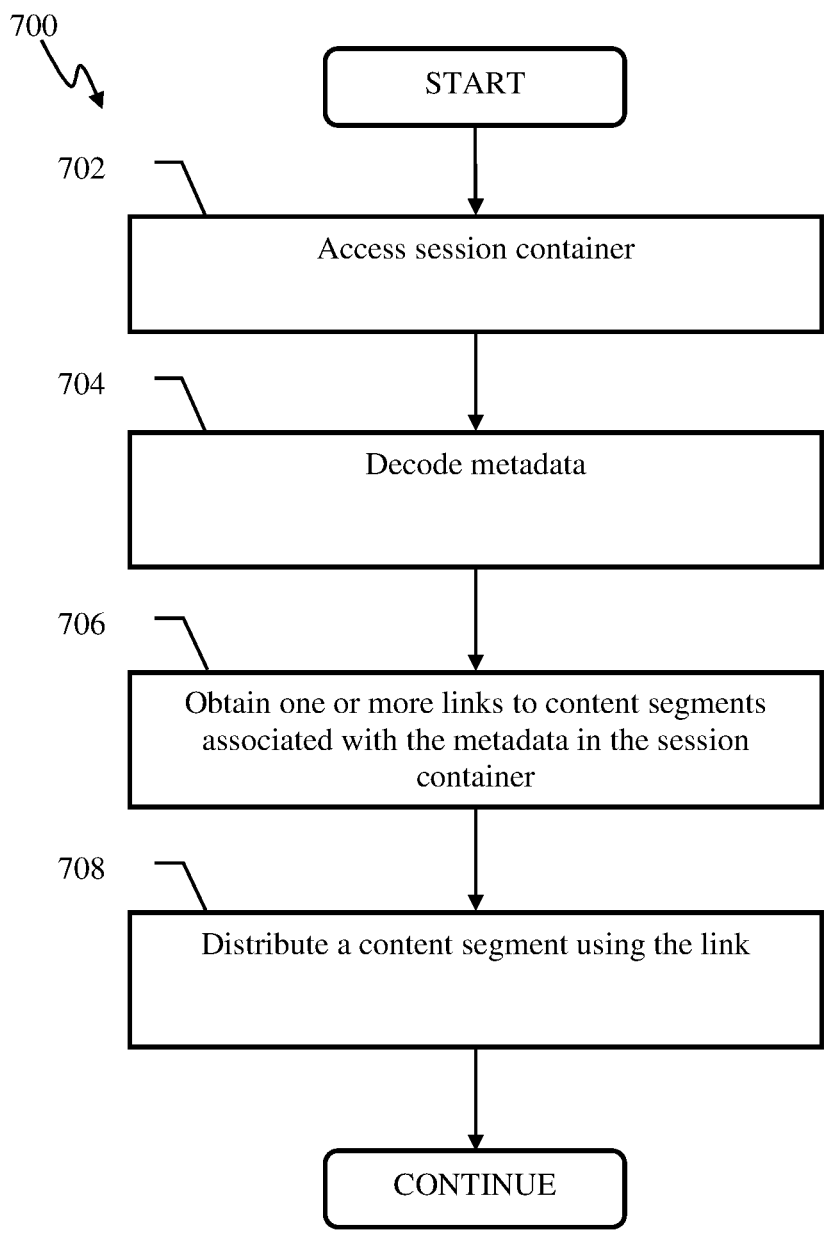
FIG. 7 is a logical flow diagram illustrating a method of communicating metadata of a session container between multiple capture devices in accordance with one implementation.

FIGS. 6A-7 illustrate methods 600, 620, 700 for combining video and metadata using implementations of the present disclosure. The operations of methods 600, 620, 700 presented below are intended to be illustrative. In some implementations, method 600, 620, 700 may be accomplished with one or more additional operations not described, and/or without one or more of the operations discussed. Additionally, the order in which the operations of method 600, 620, 700 are illustrated in FIGS. 6A-7 and described below is not intended to be limiting.

In some implementations, methods 600, 620, 700 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of methods 600, 620, 700 in response to instructions stored electronically on an electronic storage medium. The one or more processing devices may include one or more devices configured through hardware, firmware, and/or software to be specifically designed for execution of one or more of the operations of methods 600, 620, 700. Operations of methods 600, 620, 700 may be effectuated by one or more capture devices including these described with respect to FIGS. 1A-1B and/or 2A-2C.

FIG. 6A illustrates a method of obtaining a session container for storing multimedia and content information in accordance with one implementation. Method 600 of FIG. 6A may be implemented by a capture device 110 of FIG. 1A.

At operation 602 of method 600 session container may be instantiated. The session container instantiation may be effectuated based on execution of computer readable instructions by a processor of, e.g., embodied within the capture device 130 of FIG. 1B. In some implementations, the session container may be instantiated based on receipt of an instruction by the user, e.g., double press of button (e.g., 104 in FIG. 1A), speed above a given threshold, location change, elevation change, audible indication (e.g., "START METADATA") and/or other event. In one or more implementations, the session container may be instantiated based on detection of an event, e.g., camera motion parameter (e.g., speed, acceleration, orientation) breaching a threshold, location change, audible indication (e.g., "START METADATA") and/or other event. Session container instantiation operation may include one or more of the following operations, transition of camera from a standby mode to sensor acquisition mode, creation of a file (e.g., file pointer, an entry in a file system), communication with one or more metadata sources including, e.g., powering up internal metadata sources 162 (e.g., GPS, IMU), issuing instructions to one or more remote metadata source (e.g., 152 to start data acquisition), detecting paired remote devices (e.g., heart rate monitor 124, establishing a data session with one or more external metadata sources, opening one or more metadata streams, commencement of metadata recording, and/or other operations. Opening of metadata streams and/or metadata recording format are described in detail in U.S. patent application Ser. No. 14/920,427, entitled "APPARATUS AND METHODS FOR EMBEDDING METADATA INTO VIDEO STREAM" filed on 22 Oct. 2015, incorporated supra. By way of a non-limiting illustration, a user of the capture system 100 of FIG. 1A may double-press the button 104 of FIG. 1A when navigating the trajectory 500 of FIG. 5 (e.g., at the beginning of the bike ride); a capture device of an aerial unmanned vehicle may detect a stabilized trajectory state after takeoff (e.g., based on evaluation of acceleration, elevation, lateral motion and/or other parameters) and instantiate session container.

Subsequent to instantiation of the session container and transitioning of the capture device to metadata acquisition mode, metadata may be continuously captured over time interval T at operation 610. In some implementations, the time interval T may be based on duration of activity, e.g., duration of the trajectory 500 traversal; expiration of a timer, location (e.g., completing a lap in a race), and/or other parameter.

Subsequent to instantiation of the session container and transitioning of the capture device to metadata acquisition mode, method 600 may proceed to operation 604 wherein an event may be detected. In some implementations, the event may be based on receipt of an instruction by the user, e.g., long press of button (e.g., 104 in FIG. 1A), motion parameter of the capture device breaching a given threshold (e.g., sudden increase in acceleration), location, elevation, audible indication (e.g., "START VIDEO") and/or other event. In some implementations, metadata acquisition may commence and/or session container instantiation may occur when capture device is powered on; metadata acquisition may terminate and/or session container may be closed when capture device is powered off.

Responsive to determination at operation 604 that an event has occurred, the method 600 may proceed to operation 606 wherein content may be captured over time interval t. In one or more implementations, time interval t may be configured shorter than time interval T of the metadata capture of operation 610. In some implementations, operation 606 may produce a portion that may include audio, video, image, a burst of images, and/or combination thereof. Content captured at operation 606 may correspond e.g., to content portions 302, 306, 308, 352, 356, 358 described with respect to FIGS. 3A-3B. In some implementations, operation 606 may include transitioning of the capture device from metadata capture state to content acquisition state, e.g., such as described in detail with respect to FIG. 6B.

Content acquisition duration t may be based on a detection of another event, e.g., 343 corresponding to e.g., another activation of the button, detecting speed, acceleration and/or other parameter breaching another threshold, audible indication (e.g., "STOP VIDEO"), timer expiration, and/or other event. By way of a non-limiting illustration, a rider may configure the capture system to automatically instantiate video clip recording when speed and/or acceleration may exceed given criteria. In one or more implementations, the video clip duration may be pre-configured by a user (e.g., 15 seconds), and/or selected based on evaluation of past durations (e.g., average of last 3, repeat of last duration, and/or other operations), based on analysis of metadata (e.g., select clip duration corresponding to a given acceleration and/or speed range, location and/or other criteria). By way of a non-limiting illustration when navigating a given trajectory over several repetitions, the capture system may instantiate recording of video for a duration t that is a median of 3 previous recording durations.

In some implementations, content (e.g., video) may be acquired and stored in a buffer (e.g., circular, dual port buffer, and/or other configuration). Upon detection of the event 604, the buffer content (e.g., last n-seconds of captured video) may be stored into the session file. In one or more implementations, the buffer size (video duration) may be configured between 5 seconds and 120 seconds. In some implementations, upon storing the content of the buffer in a non-volatile memory, the capture device may continue video acquisition and storage in the non-volatile memory.

Operations of branch 604, 606, 608 may be performed in parallel and/or contemporaneous with operations of branch 610 of method 600.

At operation 612 a determination may be made as to whether the session may be terminated. In some implementations, the session termination may be based on an instruction by a user (e.g., camera button activation), determination that there is no available storage space (e.g., storage medium full), determination that there is no available energy resource (e.g., battery depleted), camera location (e.g., completion of a lap), and/or other cause.

Responsive to determination at operation 612 that the session is to be terminated, the method may proceed to operation 614 wherein the session container may be terminated. In some implementations the session termination operation may comprise closing of the file, powering off one or more metadata sources, termination of a connection session with one or more metadata sources (e.g., 122 in FIG. 1B), transitioning of the capture device into a lower energy use state compared to metadata acquisition state and/or video acquisition state (e.g., standby), and/or other operations.

FIG. 6B illustrates a method of operating a capture device for obtaining a session container for storing multimedia and content information in accordance with one implementation.

At operation 622 metadata acquisition indication may be detected. Metadata acquisition indication may be effectuated by a capture device (e.g., 110 in FIG. 1A), an external device (e.g., smartphone 120 in FIG. 1A), and/or other device (e.g., a remote control). In some implementations, the metadata acquisition indication may correspond to event 342 of FIG. 3A, session instantiation operation 602 of FIG. 6A, start of trajectory navigation, and/or other operations. Prior to metadata acquisition indication detection, the capture device may be operable in a lower energy use mode (e.g., standby, SB) wherein one or more components (e.g., display, image sensor, sensor controller of the capture device 130 in FIG. 1B) may be powered off. In some implementations, one or more metadata sources (e.g., internal IMU) may be operable in a lower energy use mode (e.g., low sample rate of 1 Hx or less).

Based on detecting the sensor acquisition indication, the method 620 may proceed to operation 624 wherein a capture device may transition to metadata acquisition mode characterized by energy use ES. While in metadata acquisition mode, one or more metadata sources may be activated (e.g., powered on, establish communication sessions), configured (e.g., sampling rate selected). Energy use ES of the metadata mode may be greater than energy use in standby mode ES>SB. Session container may be instantiated by operation 624.

At operation 626 metadata may be captured. In some implementations, metadata capture may comprise operation described with respect to operation 610 of FIG. 6A and/or operations described with respect to FIGS. 3A-3B.

At operation 628 a determination may be made as to whether content is to be acquired. Responsive determination that the content is to be acquire, the method 620 may proceed to operation 630. At operation 630, the capture device may transition to content acquisition mode characterized by energy use EC. In some implementations, operations 630 may include powering up image sensor module 136, activating sensor controller, performing sensor calibration and/or configuration operations (e.g., determining gain, white balance), operating optics module (e.g., configuring lens aperture, focusing distance), activation of microphone, audio module, and/or other operations.

At operation 632 content may be captured. Content capture may comprise acquiring a video clip (e.g., 306), one or more images (e.g., 356), an audio track, and/or other content.

FIG. 7 illustrates a method of communicating metadata of a session container between multiple capture devices in accordance with one implementation. In some implementations, operations of method 700 of FIG. 7 may be performed by one or multiple capture devices, e.g., devices 202, 204 of FIG. 2A and/or 252, 254 shown and described with respect to FIG. 2C.

At operation 702 link between first and second capture device may be established. In some implementations, the link may comprise a direct link (e.g., peer to peer, host/client), e.g., such as link 216 in FIG. 2A. In one or more implementations, the link may be effectuated via an intermediate entity, e.g., a hub, a wireless access point, a computer, and/or other interface, e.g., as described with respect to FIG. 2C. Various link technologies may be utilized, e.g., WiFi, Bluetooth, ZigBee, and/or other communications link.

At operation 704 first session container in the first capture device may be accessed. In some implementations, the first session container access operation may be effectuated by executing computer readable instructions by a processor of the first capture device or processor of the second capture device. The first session container access operation may include operations such as accessing storage medium, determining presence of one or more session containers, opening container file, and/or other operations.

At operation 702 metadata content of the first session container may be determined. In some implementations, session container determination may comprise reading container header portion, parsing one or more metadata records that may be stored in the container and/or other operations.

At operation 708 a metadata portion present in the second session container may be provided to the first capture device via the link established at operation 702. In some implementations, the metadata portion of operation 708 may include one or more metadata channels e.g., 310, 320, 330 of FIG. 3A.

At operation 710 an updated version of the first session container may be produces. The updated version of the first session container may include the metadata content previously present in the first session container and the metadata portion communicated at operation 708.

By way of an illustration, during an activity (e.g., bike ride) a user may utilize two capture devices 252, 254 of FIG. 2B. Device 252 may be configured to capture heart rate; device 254 of FIG. 2B may be configured to capture position (e.g., via GPS information). Individual devices 252, 254 may operate independent from one another during activity. Accordingly, metadata data obtained by one device (e.g., heart rate) may be stored in the session file by that device (e.g., 252). These data (heart rate) may not be present in the session container obtained by the other device (e.g., 254). Conversely, position data obtained by the device 254 may not be present in the session container obtained by the device 252 upon termination of the activity. Subsequent to the cessation of activity, a user may connect the capture devices via an interface e.g., 256 of FIG. 2C. In some implementations, the interface may correspond to a wireless/wireless hub, wireless access point and/or interface. In one or more implementations, the interface 256 may be embodied within one of the devices (e.g., 252 in FIG. 2C). Using methodology of method 700, metadata channels obtained by one device but not present in the session container of the other device may be transferred to the other device, e.g., heart rate information may be transferred to device 254, position information may be transferred to device 252. In some implementations, individual capture devices may obtain the same type of metadata information independent from one another. By way of an illustration, devices 252, 254 may be equipped with an IMU thereby enabling devices 252, 254 to obtain acceleration, orientation, and/or other motion information. Individual version of the motion information obtained by one device (e.g., 252), may differ from information obtained by the other device (e.g., 254). In some implementations, such metadata channels may be transferred via the interface of FIG. 2C using methodology of method 700.

Metadata acquisition and/or storage methodology of the present disclosure may advantageously provide context for captured audio/video content. By way of an illustration, upon reviewing captured footage during a mountain climb/descent metadata may include elevation and/or position information thereby providing a track for the video that may be captured for portions of the track.

In some implementations wherein multiple users may participate in an activity (e.g., multiple users watching an event such as concert, game, play, hiking a trail, riding a bike trail, surfing, skiing) metadata captured by camera of one user may provide context for video captured by other user(s). Metadata captured by individual capture devices may be rebroadcasted during activity (e.g., using the system of FIG. 2A) and/or exchanged post capture (e.g., using system of FIG. 2C). Use of metadata for the whole duration of the activity (or for a portion of the activity that extends beyond the duration of the video) may enable determination of activity parameters such as track on a map, elevation gain/loss, distance travel, energy used (mets), generated power, calories burned, cadence, gate, heart rate statistics, and/or other parameters.

In some implementations, the session file may contain metadata stored at a reduced rate compared to sample rate of the metadata that may be stored with the video.

As used herein, the term "bus" is meant generally to denote all types of interconnection or communication architecture that may be used to communicate date between two or more entities. The "bus" could be optical, wireless, infrared or another type of communication medium. The exact topology of the bus could be for example standard "bus", hierarchical bus, network-on-chip, address-event-representation (AER) connection, or other type of communication topology used for accessing, e.g., different memories in a system.

As used herein, the terms "computer", "computing device", and "computerized device", include, but are not limited to, personal computers (PCs) and minicomputers, whether desktop, laptop, or otherwise, mainframe computers, workstations, servers, personal digital assistants (PDAs), handheld computers, embedded computers, programmable logic device, personal communicators, tablet computers, portable navigation aids, J2ME equipped devices, cellular telephones, smart phones, personal integrated communication or entertainment devices, or literally any other device capable of executing a set of instructions.

As used herein, the term "computer program" or "software" is meant to include any sequence or human or machine cognizable steps which perform a function. Such program may be rendered in virtually any programming language or environment including, for example, C/C++, C#, Fortran, COBOL, MATLAB™, PASCAL, Python, assembly language, markup languages (e.g., HTML, SGML, XML, VoXML), and the like, as well as object-oriented environments such as the Common Object Request Broker Architecture (CORBA), Java™ (including J2ME, Java Beans, etc.), Binary Runtime Environment (e.g., BREW), and/or other machine code implementations.

As used herein, the terms "connection", "link", "transmission channel", "delay line", "wireless" means a causal link between any two or more entities (whether physical or logical/virtual), which enables information exchange between the entities.

As used herein, the terms "GoPro action camera", "GoPro actioncam" may be used to describe one or more of existing and/or future models of action cameras provided by GoPro, Inc., e.g., including but not limited, to HERO4 Black, HERO4 Silver, HERO4 Session, HERO, HERO+LCD, HERO3, HERO3+, HERO3+ Silver, and/or other models. The foregoing examples are not intended to restrict or limit the meaning of the generic term "action camera," as this term refers to both cameras produced and/or sold by GoPro and cameras that are not produced and/or sold by GoPro.

As used herein, the terms "integrated circuit", "chip", and "IC" are meant to refer to an electronic circuit manufactured by the patterned diffusion of trace elements into the surface of a thin substrate of semiconductor material. By way of non-limiting example, integrated circuits may include field programmable gate arrays (e.g., FPGAs), a programmable logic device (PLD), reconfigurable computer fabrics (RCFs), systems on a chip (SoC), application-specific integrated circuits (ASICs), and/or other types of integrated circuits.

As used herein, the term "memory" includes any type of integrated circuit or other storage device adapted for storing digital information including, without limitation, ROM. PROM, EEPROM, DRAM, Mobile DRAM, SDRAM, DDR/2 SDRAM, EDO/FPMS, RLDRAM, SRAM, "flash" memory (e.g., NAND/NOR), memristor memory, and PSRAM.

As used herein, the terms "microprocessor" and "digital processor" are meant generally to include digital processing devices. By way of non-limiting example, digital processing devices may include one or more of digital signal processors (DSPs), reduced instruction set computers (RISC), general-purpose (CISC) processors, microprocessors, gate arrays (e.g., field programmable gate arrays (FPGAs)), PLDs, reconfigurable computer fabrics (RCFs), array processors, secure microprocessors, application-specific integrated circuits (ASICs), and/or other digital processing devices. Such digital processors may be contained on a single unitary IC die, or distributed across multiple components.

As used herein, the term "network interface" refers to any signal, data, and/or software interface with a component, network, and/or process. By way of non-limiting example, a network interface may include one or more of FireWire (e.g., FW400, FW800, etc.), USB (e.g., USB2), Ethernet (e.g., 10/100, 10/100/1000 (Gigabit Ethernet), 10-Gig-E, etc.), MoCA, Coaxsys (e.g., TVnet™), radio frequency tuner (e.g., in-band or OOB, cable modem, etc.), Wi-Fi (802.11), WiMAX (802.16), PAN (e.g., 802.15), cellular (e.g., 3G, LTE/LTE-A/TD-LTE, GSM, etc.), IrDA families, and/or other network interfaces.

As used herein, the term "Wi-Fi" includes one or more of IEEE-Std. 802.11, variants of IEEE-Std. 802.11, standards related to IEEE-Std. 802.11 (e.g., 802.11 a/b/g/n/s/v), and/or other wireless standards.

As used herein, the term "wireless" means any wireless signal, data, communication, and/or other wireless interface. By way of non-limiting example, a wireless interface may include one or more of Wi-Fi, Bluetooth, 3G (3GPP/3GPP2), HSDPA/HSUPA, TDMA, CDMA (e.g., IS-95A, WCDMA, etc.), FHSS, DSSS, GSM, PAN/802.15, WiMAX (802.16), 802.20, narrowband/FDMA, OFDM, PCS/DCS, LTE/LTE-A/TD-LTE, analog cellular, CDPD, satellite systems, millimeter wave or microwave systems, acoustic, infrared (i.e., IrDA), and/or other wireless interfaces.

As used herein, the term "robot" may be used to describe an autonomous device, autonomous vehicle, computer, artificial intelligence (AI) agent, surveillance system or device, control system or device, and/or other computerized device capable of autonomous operation.

As used herein, the term "camera" may be used to refer to any imaging device or sensor configured to capture, record, and/or convey still and/or video imagery, which may be sensitive to visible parts of the electromagnetic spectrum and/or invisible parts of the electromagnetic spectrum (e.g., infrared, ultraviolet, and/or other invisible ranges).

It will be recognized that while certain aspects of the technology are described in terms of a specific sequence of steps of a method, these descriptions are only illustrative of the broader methods of the invention, and may be modified as required by the particular application. Certain steps may be rendered unnecessary or optional under certain circumstances. Additionally, certain steps or functionality may be added to the disclosed implementations, or the order of performance of two or more steps permuted. All such variations are considered to be encompassed within the disclosure disclosed and claimed herein.

While the above detailed description has shown, described, and pointed out novel features of the disclosure as applied to various implementations, it will be understood that various omissions, substitutions, and changes in the form and details of the device or process illustrated may be made by those skilled in the art without departing from the disclosure. The foregoing description is of the best mode presently contemplated of carrying out the invention. This description is in no way meant to be limiting, but rather should be taken as illustrative of the general principles of the technology. The scope of the disclosure should be determined with reference to the claims.

What is claimed is:

1. A computerized capture system for obtaining an imaging content and metadata, the system comprising:
   an imaging sensor configured to generate output signals conveying a series of images of the imaging content of an activity;
   a sensor interface configured to obtain information from one or more sensors other than the imaging sensor, the obtained information being relevant to the activity, the one or more sensors other than the imaging sensor including a first sensor;
   an information storage configured to store metadata comprised of information provided by at least the first sensor; and
   one or more processors configured to:
      detect a first event indicative of commencement of the activity and a metadata acquisition session during which metadata of the activity is acquired;
      detect a second event indicative of commencement of acquisition of a first portion of the imaging content, the first portion of the imaging content acquired for a first time interval, the first portion including at least some images of the series of images, wherein the second event is different from the first event and is detected during the metadata acquisition session;
      detect a third event indicative of commencement of acquisition of a second portion of the imaging content, the second portion of the imaging content acquired for a second time interval, the second portion including at least some images of the series of images, wherein the third event is different from the first event and the second event and is detected during the metadata acquisition session;

detect a fourth event indicative of cessation of the activity and the metadata acquisition session;

produce a first session file comprising the metadata of the activity acquired during the metadata acquisition session between the first event and the fourth event and a first link to the first portion of the imaging content; and produce a second session file comprising the metadata of the activity acquired during the metadata acquisition session between the first event and the fourth event and a second link to the second portion of the imaging content;

wherein the metadata acquisition session between the first event and the fourth event is configured no smaller than the first time interval or the second time interval.

2. The system of claim 1, wherein:
the imaging sensor, the sensor interface and the one or more processors are embodied in a camera apparatus; and
the metadata include information generated internally by the camera apparatus and reflect parameters of the camera apparatus.

3. The system of claim 2, wherein the parameters include one or more of motion of the imaging sensor, orientation of the imaging sensor, and position of the imaging sensor.

4. The system of claim 3, further comprising:
a shutter and a lens optically coupled to the imaging sensor; and
wherein the parameters further include one or more of white balance, contrast, saturation of one or more images within the series of images, imaging sensor temperature, shutter speed, and imaging sensor gain.

5. The system of claim 2, further comprising:
an enclosure configured to house the one or more processors and the information storage;
wherein the sensor interface comprises a wireless communications interface configured to receive data communication from an external sensor disposed external to the enclosure, the data communication configured to convey the obtained information.

6. The system of claim 5, wherein the external sensor comprises a global positioning system receiver configured to provide information related to location of the imaging sensor.

7. The system of claim 2, wherein the camera apparatus comprises a tactile input element; and the first event is based on an activation of the tactile input element.

8. The system of claim 2, wherein duration of the first time interval is configured based on a fifth event, the fifth event comprising activation of a user interface module coupled to the one or more processors.

9. The system of claim 2, wherein:
the sensor interface comprises a wireless communications link;
the metadata is provided by a mobile communication device providing information related to location of the system via the wireless communications link; and
duration of the first time interval is configured based on expiration of a timer.

10. The system of claim 1, wherein the system comprises a microphone, and the first event is based on detection of audible signal comprising spoken keywords.

11. The system of claim 1, wherein:
the session file includes links to other portions of the imaging content acquired during other time intervals within the metadata acquisition session between the first event and the fourth event.

12. The system of claim 1, wherein:
the session file includes the first portion of the imaging content; and
the metadata acquisition session between the first event and the fourth event is configured greater than the duration of the first time interval.

13. The system of claim 1, further comprising:
an enclosure configured to enclose the one or more processors, the imaging sensor and the sensor interface; and
a sensor disposed external to the enclosure coupled to the sensor interface, the sensor configured to provide the obtained information configured to characterize a physiological condition of a user of the system.

14. The system of claim 2, wherein the first sensor is disposed remote from the camera apparatus and communicates with the one or more processors via a remote link.

15. The system of claim 1, wherein the first event is based on a timer expiration.

16. The system of claim 1, wherein:
the imaging content comprises multiple video clips spaced by time intervals within the metadata acquisition session between the first event and the fourth event;
one of the multiple video clips includes at least some images of the series of images; and
the metadata comprises sensor information within the metadata acquisition session between the first event and the fourth event.

17. An action camera apparatus, comprising:
an imaging sensor configured to generate output signals conveying a series of images;
a sensor other than the imaging sensor, the sensor configured to obtain information relevant to one or more images within the series of images;
a user interface configured to receive one or more indications;
an information storage configured to store metadata including the information obtained by the sensor; and
one or more processors operably coupled to the imaging sensor, the sensor, and the information storage, the one or more processors configured to:
based on a detection of a first event by the user interface, the first event indicative of commencement of a metadata acquisition session during which metadata is acquired, transition the one or more processors into sensor acquisition mode characterized by sensor mode energy use;
based on a detection of a second event, the second event indicative of commencement of a first capture period during which one or more images of the series of images are acquired, transition the one or more processors into image acquisition mode characterized by image mode energy use, the image mode energy use requiring more power than the sensor mode energy use;
based on a detection of a third event indicative of cessation of the metadata acquisition session, cause storing of information contained in the information storage in a container, the container comprising at least the metadata obtained during the metadata acquisition session between the first event and the third event and the one or more images of the series of images.

18. The action camera apparatus of claim 17, wherein:
the series of images comprise a first portion of images characterized by a first imaging duration; and
the first imaging duration is configured shorter than the metadata acquisition session between the first event and the third event.

19. The action camera apparatus of claim 18, wherein:
the series of images further comprise a second portion of images acquired during a second capture period;
the second capture period being spaced in time from the first capture period; and
the second capture period is shorter than the metadata acquisition session between the first event and the third event.

20. The action camera apparatus of claim 19, wherein the first series of images comprise a video segment; and
the container is configured in accordance with MP4 compatible multimedia container format.

* * * * *